United States Patent
Zhang et al.

(10) Patent No.: US 12,539,577 B2
(45) Date of Patent: Feb. 3, 2026

(54) SYSTEM AND METHOD FOR DETECTING A MEMBRANE FAILURE IN A CHEMICAL MECHANICAL POLISHING SYSTEM

(71) Applicant: Applied Materials, Inc., Santa Clara, CA (US)

(72) Inventors: Chang Zhang, Santa Clara, CA (US); Jian J. Chen, Fremont, CA (US); Quoc Truong, San Ramon, CA (US); Jamie Stuart Leighton, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 323 days.

(21) Appl. No.: 17/959,076

(22) Filed: Oct. 3, 2022

(65) Prior Publication Data
US 2024/0109164 A1    Apr. 4, 2024

(51) Int. Cl.
*B24B 49/12* (2006.01)
*B24B 37/005* (2012.01)
*G01F 1/661* (2022.01)

(52) U.S. Cl.
CPC ............ *B24B 49/12* (2013.01); *B24B 37/005* (2013.01); *G01F 1/661* (2013.01)

(58) Field of Classification Search
CPC ....... B24B 37/005; B24B 37/30; B24B 49/08; B24B 49/12; B24B 49/16; G01F 1/66; G01F 1/661
USPC ........................................................ 451/6, 8
See application file for complete search history.

(56) References Cited

U.S. PATENT DOCUMENTS

| | | | |
|---|---|---|---|
| 3,936,192 | A | 2/1976 | Skala |
| 5,738,574 | A | 4/1998 | Tolles et al. |
| 6,183,354 | B1 | 2/2001 | Zuniga et al. |
| 6,341,995 | B1 | 1/2002 | Lai et al. |
| 6,503,134 | B2 | 1/2003 | Shendon |
| 6,508,695 | B2 | 1/2003 | Tanikawa |
| 6,645,050 | B1 | 11/2003 | Butterfield |
| 6,663,466 | B2 | 12/2003 | Chen et al. |
| 6,857,931 | B2 | 2/2005 | Chen et al. |
| 7,699,688 | B2 | 4/2010 | Zuniga et al. |

(Continued)

FOREIGN PATENT DOCUMENTS

| | | |
|---|---|---|
| JP | 2004-349340 A | 12/2004 |
| KR | 10-2003-0027389 A | 4/2003 |

(Continued)

OTHER PUBLICATIONS

International Search Report and Written Opinion in related application PCT/US2023/030872 dated Dec. 7, 2023.

(Continued)

*Primary Examiner* — C. A. Rivera
(74) *Attorney, Agent, or Firm* — Patterson + Sheridan, LLP

(57) ABSTRACT

A polishing system includes a pressure system, a substrate carrier including a membrane, a first sensor, and a control system. A first compartment of the membrane is fluidly coupled to the pressure system. The first sensor is configured to monitor the pressure system and produce a first output based on conditions detected in the pressure system. The control system coupled to the first sensor and configured to process the first output to produce a first processed output, and the control system configured to compare the first processed output to a threshold to detect a presence of a fluid in the pressure system.

20 Claims, 14 Drawing Sheets

(56) References Cited

U.S. PATENT DOCUMENTS

| | | |
|---|---|---|
| 8,882,563 B2 | 11/2014 | Boo et al. |
| 9,168,629 B2 | 10/2015 | Schauer |
| 9,199,354 B2 | 12/2015 | Duescher et al. |
| 9,987,718 B2 | 6/2018 | Schauer |
| 10,974,363 B2 | 4/2021 | Schauer |
| 2001/0041526 A1 | 11/2001 | Perlov |
| 2005/0260925 A1 | 11/2005 | Togawa |
| 2006/0052037 A1 | 3/2006 | Izumi et al. |
| 2007/0111637 A1 | 5/2007 | Togawa et al. |
| 2009/0314369 A1 | 12/2009 | Pozniak |
| 2010/0026988 A1 | 2/2010 | Cros et al. |
| 2010/0035526 A1 | 2/2010 | Tolles et al. |
| 2011/0051140 A1 | 3/2011 | Stevens et al. |
| 2012/0323502 A1* | 12/2012 | Tanoura .......... G01F 1/203 702/49 |
| 2013/0237129 A1* | 9/2013 | Schauer .......... B24B 49/12 451/6 |
| 2014/0138355 A1 | 5/2014 | Yavelberg |
| 2015/0160137 A1 | 6/2015 | Lee et al. |
| 2018/0088054 A1* | 3/2018 | Stockwell .......... G01F 1/661 |
| 2018/0290260 A1 | 10/2018 | Schauer |
| 2022/0072682 A1 | 3/2022 | Oh et al. |

FOREIGN PATENT DOCUMENTS

| | | |
|---|---|---|
| KR | 101516989 B1 | 4/2015 |
| TW | 436380 B | 5/2001 |
| TW | 478998 B | 3/2002 |
| TW | I292729 | 11/2008 |
| TW | 201104373 A | 2/2011 |

OTHER PUBLICATIONS

Korean Office Action for Application No. 10-2025-7014071 dated Nov. 20, 2025.

\* cited by examiner

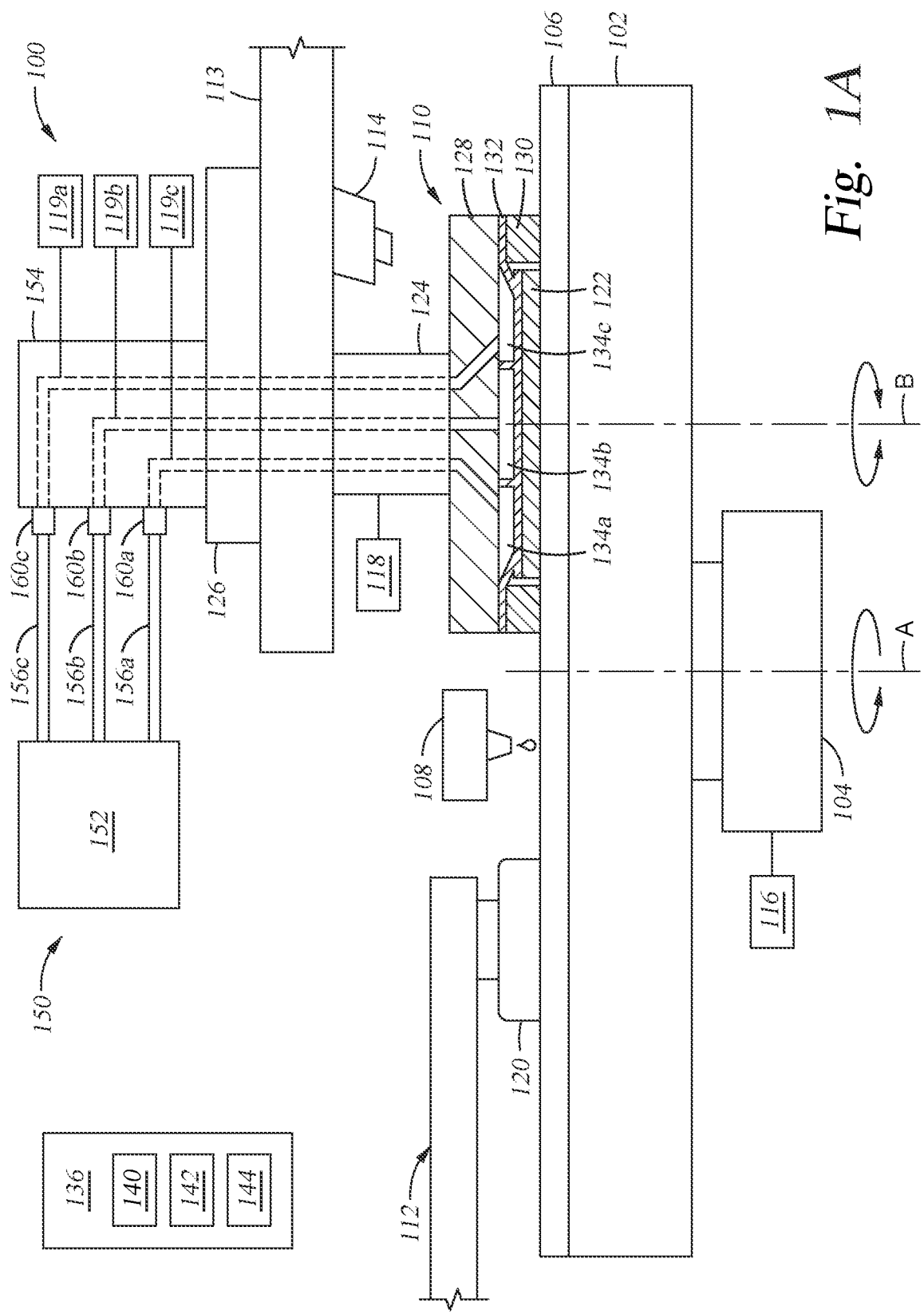

$$\sigma_i^2 = \sum_{k=i}^{i+N} (V_k - a)^2 \quad \text{---} 310$$

SYSTEM AND METHOD FOR DETECTING A MEMBRANE FAILURE IN A CHEMICAL MECHANICAL POLISHING SYSTEM

BACKGROUND

Field

Embodiments described herein generally relate to semiconductor device manufacturing, particularly chemical mechanical polishing (CMP) systems used in semiconductor device manufacturing and related methods.

Description of the Related Art

Chemical mechanical polishing (CMP) is commonly used to manufacture high-density integrated circuits to planarize a material layer on the substrate, to clear an excess of material from an underlying material layer surface, or both. In a typical CMP process, a substrate is retained in a carrier head that has a membrane that can be pressurized to press the backside of the substrate towards a rotating polishing pad in the presence of polishing fluid. A vacuum can be applied to the membrane to vacuum chuck the substrate to the carrier head. The polishing pad is often formed of a polymer material with surface asperities that facilitate the transport of the polishing fluid to the interface between the substrate's material surface and the moving polishing pad disposed there beneath. The polishing fluid typically comprises an aqueous solution of one or more chemical components and nanoscale abrasive particles suspended in the aqueous solution, often referred to as a polishing fluid or a polishing slurry.

Failure of the membrane, such as a hole or a tear, compromises the pressure integrity of the membrane. The failed membrane can no longer be pressurized as desired during a polishing process, which may result in an insufficient, uneven polish, cause damage to the substrate, or result in the substrate slipping out of engagement with the membrane during polishing, leading to scrapping of the entire substrate or loss of integrated circuits. The damaged membrane may not be able to vacuum-chuck the substrate to the substrate carrier head, which may prevent moving the substrate or result in an inadvertent drop of the substrate during transport.

Additionally, failure of the membrane allows for undesirable ingress of fluid, such as polishing fluid, into pneumatics of the CMP system. Ingress of fluid can damage the pneumatics, or may result in a blocked or choked flow path in the pneumatics that hinders a CMP operation.

Accordingly, there is a need in the art to detect the failure of a membrane.

SUMMARY

The present disclosure generally relates to monitoring for and detecting the presence of a contaminant in a pressure system of polishing system with a sensor.

In one embodiment, a polishing system includes a pressure system, a substrate carrier including a membrane, a first sensor, and a control system. A first compartment of the membrane is fluidly coupled to the pressure system. The first sensor is configured to monitor the pressure system and produce a first output based on conditions detected in the pressure system. The control system coupled to the first sensor and configured to process the first output to produce a first processed output, and the control system configured to compare the first processed output to a threshold to detect a presence of a fluid in the pressure system.

In one embodiment, a non-transitory computer-readable medium comprising instructions that when executed by one or more processors cause a polishing system to conduct an integrity test of a membrane positioned in a carrier head. The integrity test includes applying a vacuum to a membrane with a pressure system over a period of time, processing an output of a sensor monitoring the pressure system over the period of time to produce a processed output, and comparing the processed output to a threshold to monitor for a presence of a liquid in the pressure system.

In one embodiment, a method of operating a polishing system includes operating a carrier head including a membrane engageable with a substrate, wherein an internal pressure of the membrane is selectively changed by a pressure system. The method further includes monitoring for a failure of the membrane during the operation with a sensor, wherein the monitoring incudes processing an output of the sensor to produce a processed output and comparing the processed output to a threshold based on a gas in the pressure system. The method further includes alerting a user of a failure of the membrane.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of the scope of the disclosure, as the disclosure may admit to other equally effective embodiments.

FIG. 1A is a schematic side view of an exemplary polishing station which may be used to practice the methods set forth herein, according to one embodiment.

FIG. 2A illustrates an exemplary circuit diagram of the sensor. FIGS. 2B-2C are schematic views of the sensor sensing for fluid in a flow path to illustrate the lensing effect of a fluid.

FIG. 2D illustrates the output of the sensor upon detecting light to illustrate the effects of lensing and absorption for various mixtures of oxide slurries. FIGS. 2E-2F are schematic views of the sensor sensing for fluid in a flow path to illustrate the effect of total internal reflection by a fluid. FIGS. 2G-2H are schematic views of the sensor sensing for fluid in a flow path to illustrate the effect of total internal reflection by a fluid.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to chemical mechanical polishing systems (CMP) systems and processes used in the manufacturing of electronic devices. In particular, embodiments herein relate to detecting the ingress of polishing fluid into a flow path.

Figure 1B:
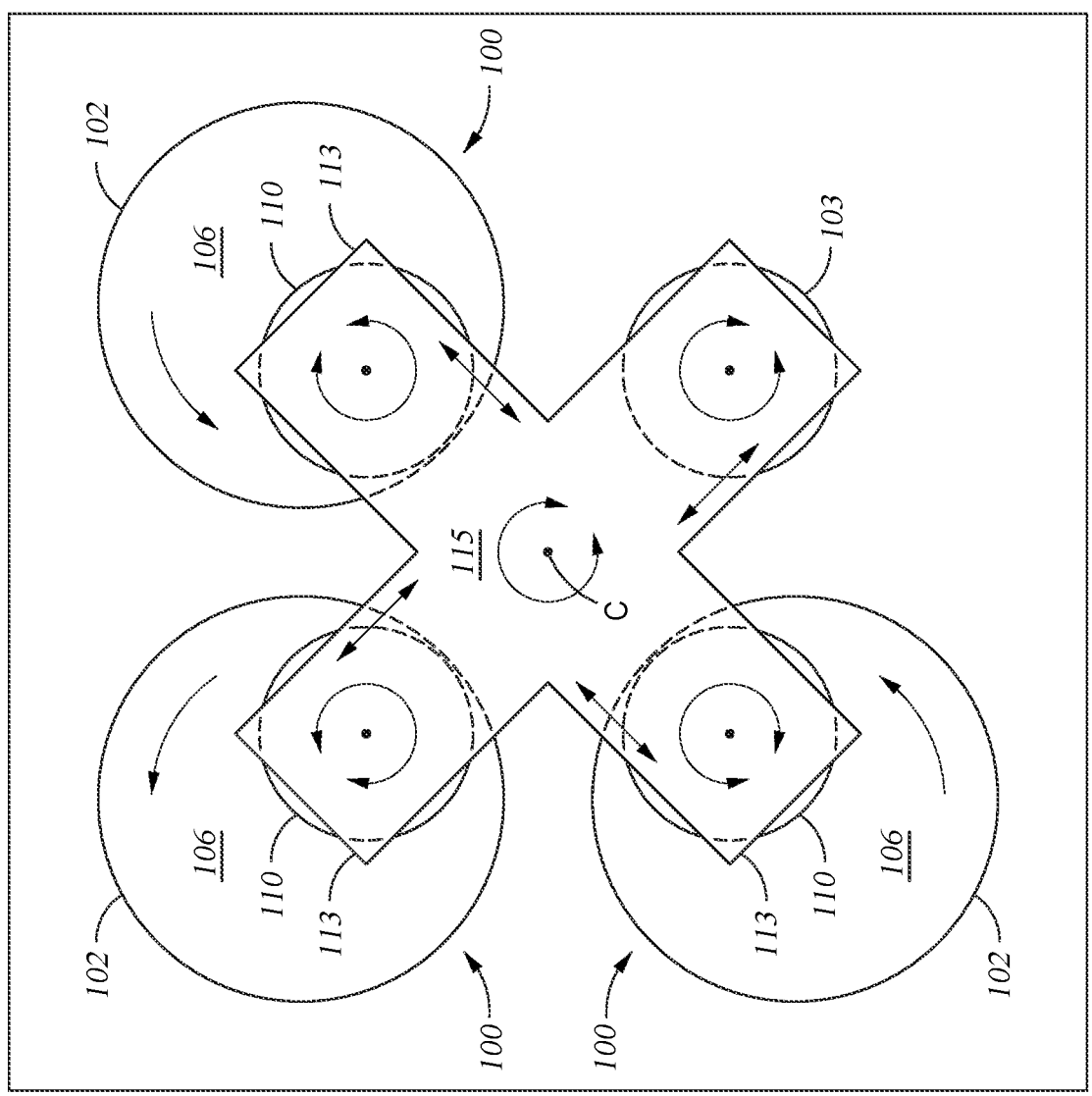
FIG. 1B is a schematic top view of a multi-station polishing system which may be used to practice the methods set forth herein, according to one embodiment.

FIG. 1A is a schematic side view of an exemplary polishing station 100, according to one embodiment, which may be used to practice the methods set forth herein. FIG. 1B is a schematic top view of a multi-station polishing system 101 comprising a plurality of polishing stations 100, where each of the polishing stations 100a-c are substantially similar to the polishing station 100 described in FIG. 1A. In FIG. 1B, at least some of the components with respect to the polishing station 100 described in FIG. 1A are not shown on the plurality of polishing stations 100 in order to reduce visual clutter.

As shown in FIG. 1A, the polishing station 100 includes a platen 102, a polishing pad 106 disposed on the platen 102 and secured thereto, a fluid delivery arm 108 disposed over the polishing pad 106, a substrate carrier 110 (shown in cross-section), a pad conditioner assembly 112, a pressure system 150, and the sensors 160a-c.

The substrate carrier 110 is suspended from a carriage arm 113 of a substrate handling carriage 115 (FIG. 1B) so that the substrate carrier 110 is disposed over the polishing pad 106 and faces there towards. The substrate handling carriage 115 is used to move the substrate carrier 110, and thus a substrate 122 chucked therein, between a substrate loading station 103 and/or between polishing stations 100 of the multi-station polishing system 101. A fluid may be present at the substrate loading station 103 and at a polishing station 100. For example, a polishing fluid may be present at a polishing station 100 and water may be present in the substrate loading station 103.

The pad conditioner assembly 112 may include a fixed abrasive conditioning disk 120, e.g., a diamond impregnated disk, which may be pushed against the polishing pad 106 to rejuvenate the surface thereof and/or to remove polishing byproducts or other debris therefrom. In other embodiments, the pad conditioner assembly 112 may comprise a brush (not shown).

A platen actuator 104 is coupled to the platen 102. During substrate polishing, the platen actuator 104 is used to rotate the platen 102 about a platen axis A and the substrate carrier 110 is disposed above the platen 102 and faces towards the platen 102. The substrate carrier 110 is used to push a to-be-polished surface of a substrate 122, disposed therein, against the polishing surface of the polishing pad 106 while simultaneously rotating about a carrier axis B. The substrate 122 is pushed against the pad 106 in the presence of a polishing fluid provided by the fluid delivery arm 108. The properties of the polishing fluid may be selected to achieve a desired polished surface. The polishing fluid may be an abrasive slurry, such as an aqueous oxide slurry. The polishing fluid may contain abrasive particles, a pH adjuster and/or chemically active components to enable chemical mechanical polishing of the substrate 122. Typically, the rotating substrate carrier 110 oscillates between an inner radius and an outer radius of the platen 102 to, in part, reduce uneven wear of the surface of the polishing pad 106. Here, the substrate carrier 110 is rotated using a first actuator 124 coupled to the carriage arm 113 and is oscillated using a second actuator 126 coupled to the carriage arm 113.

In some embodiments, the polishing station includes one or a combination of a polishing pad temperature sensor 114, such as an infrared (IR) temperature sensor, a platen torque sensor 116, and a carrier torque sensor 118. Typically, the pad temperature sensor 114 is disposed above the platen 102 and faces there towards. The pad temperature sensor 114 is positioned to measure the polishing pad temperature directly behind the substrate carrier 110 in the direction of the platen 102 rotation, i.e., proximate to the trailing edge of the substrate carrier 110. In some embodiments, the pad temperature sensor 114 is coupled to the carriage arm 113.

In some embodiments, the platen torque sensor 116 is coupled to the platen actuator 104 and the carrier torque sensor 118 is coupled to first actuator 124. In some embodiments, the platen torque sensor 116 and the carrier torque sensor 118 are used to monitor motor currents used to rotate the platen 102 and the substrate carrier 110 about their respective axis A, B. In some embodiments changes in the motor current may be used to detect a desired polishing endpoint of a polishing process. In other embodiments, the motor current may be used to detect variations in the amount of polishing fluid delivered to the polishing pad and surface of the substrate 122 at any instant in time during polishing. For example, a higher friction sensed by the motor current may be caused by a drop in polishing fluid flow or change in the composition of the polishing fluid.

The substrate carrier 110 may include a substrate carrier head 128, a carrier ring 130 coupled to the substrate carrier head 128, and a membrane 132 disposed radially inward of the carrier ring 130 to provide a mounting surface for the substrate 122. During substrate polishing, the carrier ring 130 circumscribes the substrate 122 to prevent the substrate 122 from slipping from the substrate carrier 110. The membrane 132 is coupled to the substrate carrier head 128 to define a one or more compartments 134, such as a first compartment 134a, a second compartment 134b, and a third compartment 134c. In some embodiments with multiple compartments, such as shown in FIG. 1A, each compartment 134 is isolated from the other compartments 134.

The pressure system 150 includes a pneumatic assembly 152, a rotary union 154, and one or more flow paths 156. The pressure system 150 is configured to apply a pressure or a vacuum to the membrane 132. The internal pressure of the membrane 132 is selectively changed by the pressure system 150. As shown in FIG. 1A, the rotary union 154 may be coupled to the carriage arm 113, such as being coupled to the second actuator 126. The rotary union 154 fluidly connects each compartment 134a, 134b, 134c to the pneumatic assembly 152. For example, as shown in FIG. 1A, the first compartment 134a is connected to the pneumatic assembly 152 by a first flow path 156a, the second compartment 134b is connected to the pneumatic assembly 152 by a second flow path 156b, and the third compartment 134c is connected to the pneumatic assembly 152 by a third flow path 156c. A portion of each flow path 156a-c may be disposed in or on the rotary union 154, the first actuator 124, the second actuator 126, and/or the carriage arm 113. The rotary union 154 facilitates fluid communication between the pneumatic assembly 152 and the compartments 134a, 134b, 134c while the substrate carrier 110 is rotated by the first actuator 124 and/or oscillated by the second actuator 126. The rotary union 154 may also facilitate an electrical connection and/or fluid connection with another fluid source, such as a hydraulic fluid source, to the first actuator 124, the second actuator 126, and/or the substrate carrier 110.

The pneumatic assembly 152 may include regulators, valves, and pumps (not shown) used to pressurize or apply a vacuum to the compartments 134a, 134b, 134c. The pneumatic assembly 152 may use a gas, such as clean dry air (CDA) or nitrogen gas. The pneumatic assembly 152 may include an independent pressure and vacuum source for each compartment 134a, 134b, 134c. The pneumatic assembly 152 may independently control the pressure in each compartment 134a, 134b, 134c. The pressure in each compartment 134a, 134b, 134c may be different to facilitate the distribution of force exerted on the substrate 122 by the membrane 132. In some embodiments, the polishing station 100 includes a first pressure sensor 119a in communication with the first flow path 156a to monitor the pressure in the first compartment 134a, a second pressure sensor 119b in communication with the second flow path 156b to monitor the pressure in the second compartment 134b, and a third pressure sensor 119c in communication with the third flow path 156c to monitor the pressure in the third compartment 134c. In some embodiments, the multi-station polishing system 101 may have a pneumatic assembly 152 for each polishing station 100. In some embodiments, the multi-station polishing system 101 may have a single pressure system 150 that includes a dedicated pneumatic assembly 152, rotary union 154, and flow paths 156, for each polishing station 100. However, the multi-station polishing system 101 may have a pressure system 150 with a single pneumatic assembly 152 for all the polishing stations 100.

The compartments 134a, 134b, 134c are pressurized, such as with CDA, by the pressure system 150 to cause the membrane 132 to exert a downward force against a non-active (backside) surface of the substrate 122, while the substrate carrier 110 rotates, to push the substrate 122 against the polishing pad 106. The compartments 134a, 134b, 134c facilitate adjustments to the distribution of forces exerted across the backside surface of the substrate 122 by allowing for differences in pressures therein. Before and after polishing, a vacuum is applied to the compartment 134a, 134b, 134c by the pneumatic assembly 152 so that the membrane 132 is deflected upwards to create a low pressure pocket between the membrane 132 and the substrate 122, thus vacuum-chucking the substrate 122 to the substrate carrier 110. The vacuum may be applied by reducing the pressure of CDA in the compartments 134a, 134b, 134c with a vacuum pump (not shown) of the pneumatic assembly 152.

Failure of the membrane 132, such as a hole or a tear, compromises the pressure integrity of the membrane 132. The failed membrane 132 can no longer be pressurized as desired during a polishing process, which may result in an insufficient, non-uniform polish or may cause damage to the substrate 122. Additionally, a loss in pressurization of the membrane 132 may result in the substrate 122 slipping out of an engagement with the membrane 132 during polishing, which can damage the substrate 122. Additionally, a damaged membrane 132 hinders the ability of the pneumatic assembly 152 to apply a vacuum. The damaged membrane 132 may not be able to vacuum-chuck the substrate 122 to the substrate carrier head 128. Thus, a failed membrane 132 may prevent the removal of the substrate 122 from the polishing pad 106 with the substrate carrier 110. A failed membrane may also cause the substrate 122 to be inadvertently dropped by the substrate carrier head 128, such as dropping the substrate 122 as it is transported from a polishing station 100 to the substrate loading station 103 or form one polishing station 100 to another polishing station 100. The substrate 122 may be damaged if dropped by the substrate carrier head 128.

Failure of the membrane 132 allows the undesirable ingress of fluid, such as polishing fluid, into the pressure system 150. The ingress of the fluid, such as the polishing fluid, may physically damage and/or obstruct the pressure system 150. For example, the ingress of fluid into the pneumatic assembly 152 may result in a damaged pump, such as a vacuum pump. Polishing fluid may build up within a flow path 156, which may choke or block the flow path 156. For example, the polishing fluid may coat a flow path 156 with a thickness to restrict fluid flow. As a result of the restricted fluid communication, the pressure system 150 may not be able to apply the desired pressure to the compartment 134 to create the desired distribution of force on the substrate 122. The polishing fluid may coat the inner surface of the membrane 132, which may reduce the flexibility of the membrane and compromise the ability of the membrane 132 to effectively polish the substrate 122. Ingress of fluid into the pressure system 150 may result in immediately halting polishing operations. Ingress of fluid leads to substantial down time in order for the pressure system 150 to be opened up, purged, cleaned, replaced, and/or repaired. Furthermore, acids may be used in the polishing fluid. The ingress of the fluid through a broken membrane 132 may chemically corrode the pressure system 150 in addition to the physical damage.

The polishing station 100 may include one or more sensors, such as sensors 160a-c, to monitor the integrity of the membrane 132. The sensors 160a-c may be optical sensors. The sensor 160a-c monitors the integrity of the membrane by sensing for the presence of a fluid, such as the polishing fluid, when the pressure system 150 applies a vacuum to the membrane 132. The polishing station 100 may include a first sensor 160a to monitor for fluid ingress into the first flow path 156a through the first compartment 134a, a second sensor 160b to monitor for fluid ingress into the second flow path 156b through the second compartment 134b, and a third sensor to monitor for fluid ingress into the third flow path 156c through the third compartment 134c. The operation of the sensors 160a-c will be described in more detail below with respect to FIGS. 2A-2H and FIGS. 3A-3C.

Each sensor 160a-c may be attached to the rotary union 154 as shown in FIG. 1A. In some embodiments, each sensor 160a-c may be disposed at another location on the polishing station 100 in communication with pneumatic assembly 152. For example, each sensor 160a-c may be attached to a corresponding flow path 156a-c. In some embodiments, each sensor 160a-c is a part of a coupling connecting together portions of a respective flow path 156a-c.

The operation of the multi-station polishing system 101 and/or the individual polishing stations 100 thereof is facilitated by a control system 136. The control system 136 may receive inputs from the temperature sensor 114, the platen torque sensor 116, and the carrier torque sensor 118, the pressure sensors 119a-c, and the sensors 160a-c. The control system 136 may react to these inputs to change an operating parameter of the multi-station polishing system 101.

For example, the control system 136 may be used to maintain pressures in each of the compartments 134a, 134b, 134c allowing for fine control over the distribution of force exerted by the membrane 132 against the substrate 122. The control system 136 may cause the pneumatic assembly 152 to adjust a pressure in a compartment 134a-c, such as adjusting the pressure to a target pressure. In some embodiments, the control system 136 may generate a system alert and/or halt the operation of a polishing station 100 in response to a sensor, such as first sensor 160a, detecting a fluid (e.g., such as a polishing fluid).

The control system 136 may include a programmable central processing unit (CPU 140) which is operable with a memory 142 (e.g., non-volatile memory) and support circuits 144. The support circuits 144 are conventionally coupled to the CPU 140 and comprise cache, clock circuits, input/output subsystems, power supplies, and the like, and combinations thereof coupled to the various components of the multi-station polishing system 101, to facilitate control of a substrate polishing process. For example, in some embodiments the CPU 140 is one of any form of general purpose computer processor used in an industrial setting, such as a programmable logic controller (PLC), for controlling various polishing system components and sub-processors. The memory 142, coupled to the CPU 140, is non-transitory and is typically one or more of readily available memory such as random access memory (RAM), read only memory (ROM), floppy disk drive, hard disk, or any other form of digital storage, local or remote.

Herein, the memory 142 is in the form of a computer-readable storage media containing instructions (e.g., non-volatile memory), that when executed by the CPU 140, facilitates the operation of the multi-station polishing system 101. The instructions in the memory 142 are in the form of a program product such as a program that implements the methods of the present disclosure (e.g., middleware application, equipment software application, etc.). The program code may conform to any one of a number of different programming languages. In one example, the disclosure may be implemented as a program product stored on computer-readable storage media for use with a computer system. The program(s) of the program product define functions of the embodiments (including the methods described herein).

Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure.

FIGS. 2A-2H, are used to illustrate the first sensor 160a and to explain various optical effects caused by a fluid flowing past the first sensor 160a. FIGS. 2A-2C and FIGS. 2E-2H illustrate the first sensor 160a monitoring the first flow path 156a. FIGS. 2A-2C and 2E-2H are representative of the second sensor 160b and the third sensor 160c.

Figure 2A:
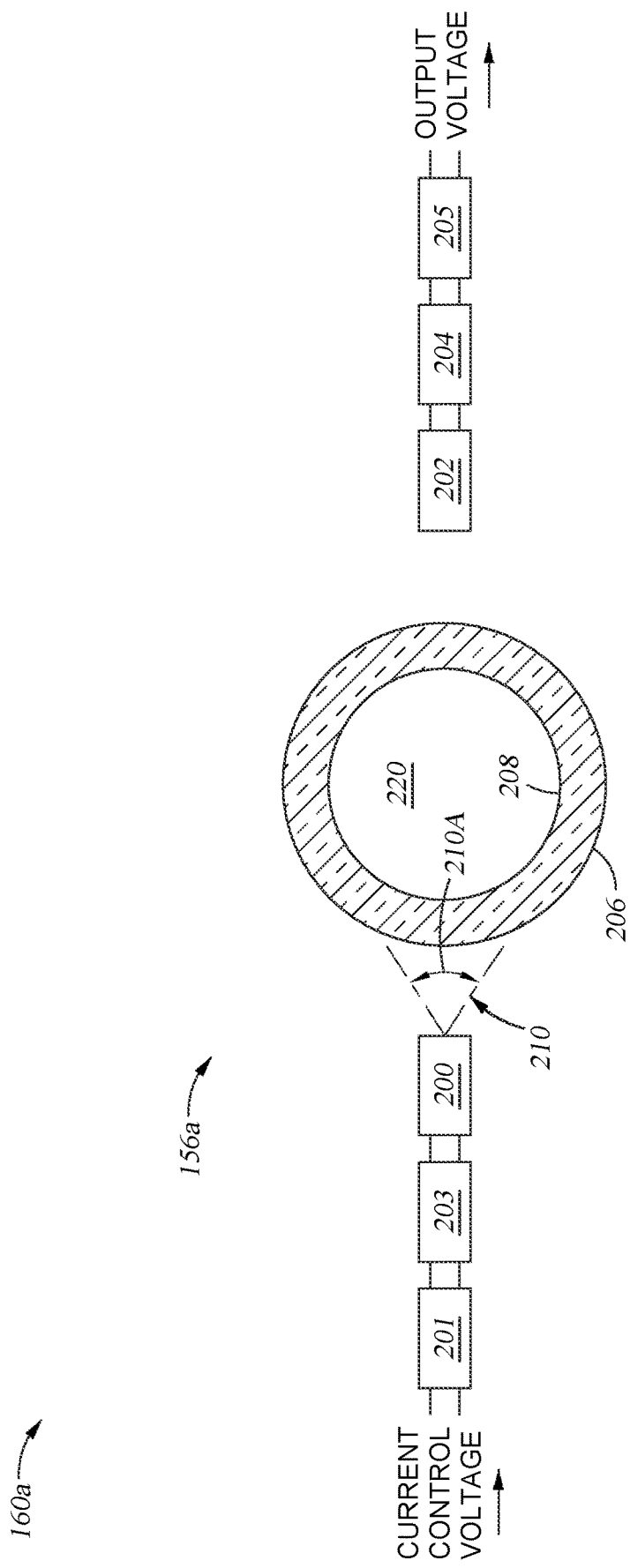
FIGS. 2A-2H, are used to illustrate a sensor and to explain various optical effects caused by a fluid flowing past the sensor.

FIG. 2A illustrates an exemplary circuit diagram of the first sensor 160a which is representative of the second and third sensors 160b,c. The sensor 160a includes a light source 200, such as a Light-Emitting Diode (LED) or a Laser Diode (LD), and a photo diode 202. The light source 200 and photo diode 202 are positioned at locations on opposite sides of the flow path 156a. The light source 200 emits a light 210, and the photo diode 202 is configured to detect the light 210. The light 210 may be emitted at an emitting angle 210a, and the light 210 is directed toward the flow path 156.

A control voltage is fed from a power source to a buffered amplifier 201, which drives an electrical current to the light source 200 through the voltage-controlled current source 203. The light output of the light source 200 is determined and controlled by the current flowing through the light source 200 from the voltage-controlled current source 203. The current flowing through the light source 200 is selectively adjusted to produce light over a dynamic range to be detected by the photo diode 202 during various process conditions. For example, increasing the current increases the intensity of the light 210.

The light 210 detected by the photo diode 202 produces a signal that is directed to a current-to-voltage converter 204 and then a buffered amplifier 205 in a reverse process as the current fed to the light source 200 to produce an output voltage. The output voltage corresponds to the amount of light 210 detected by the photo diode 202, and the output voltage is received by the control system 136.

A cross-section of the first flow path 156a is shown in FIG. 2A. The flow path 156a may include a tubing 206 with a bore 208. The tubing 206 may be a semi-transparent or a transparent tubing formed of a chemically resistant material. For example, the tubing 206 may be a fluoropolymer material, such as a Teflon tubing. The tubing 206 may have an outer diameter of between 5 mm and 10 mm for example. The light source 200 and photo diode 202 are disposed on opposing sides of the tubing 206.

Figure 2B:
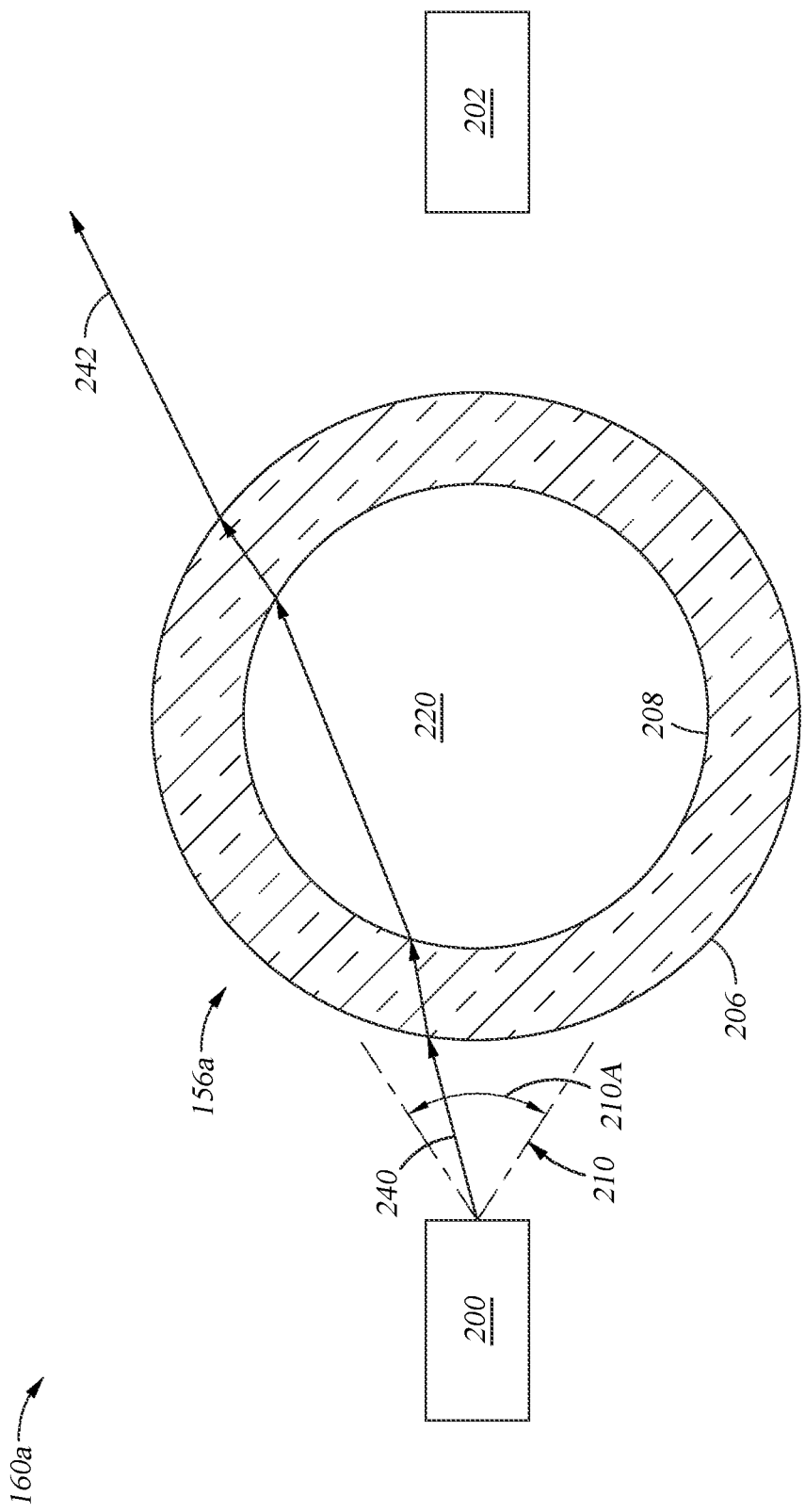
Figure 2C:
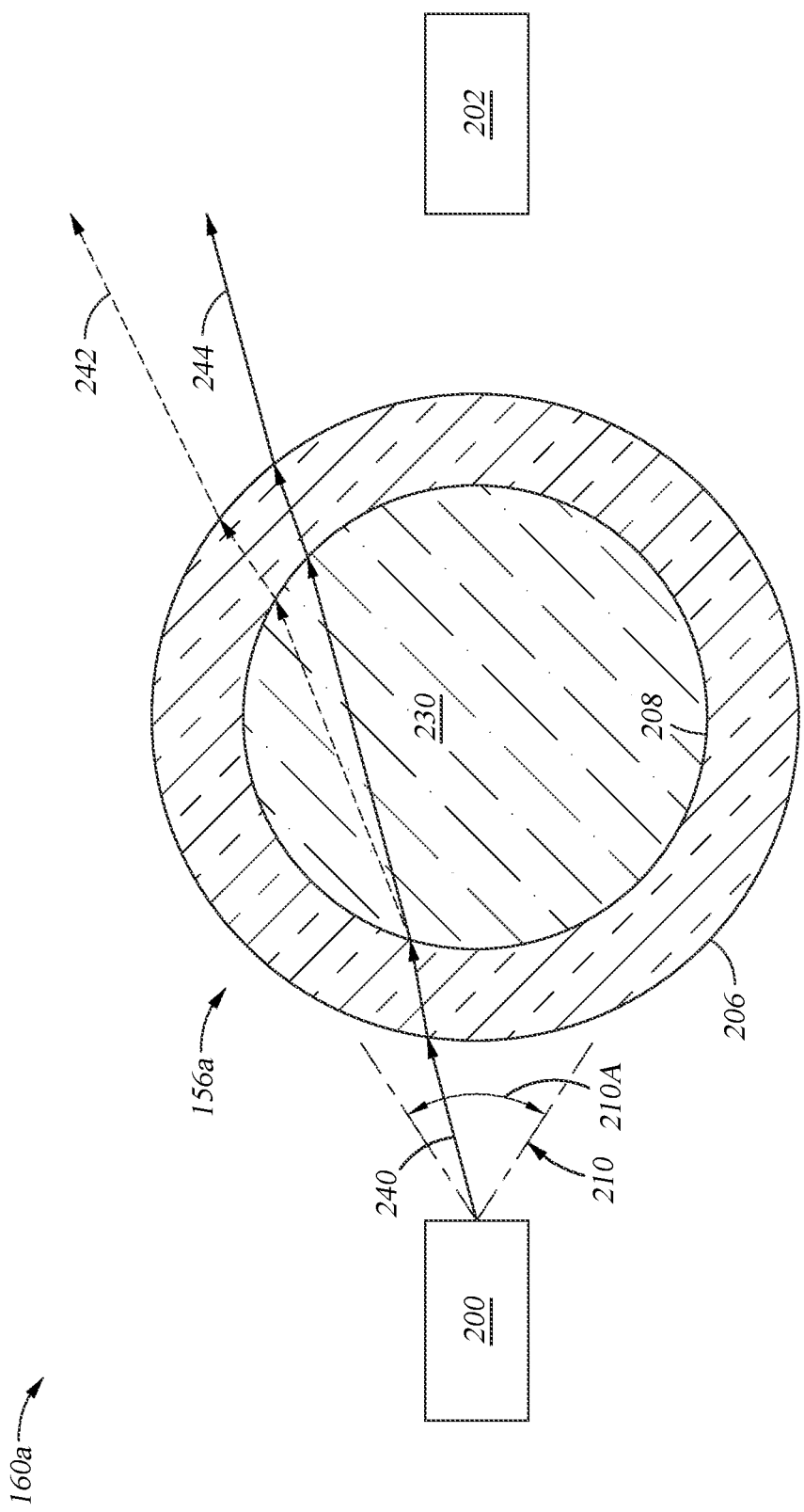

FIGS. 2B-2C are schematic views of the first sensor 160a sensing for fluid in the first flow path 156a to illustrate the lensing effect of a fluid.

FIG. 2B illustrates a gas 220, such as nitrogen gas or a dried air, disposed in the bore 208 of the tubing 206. The gas 220 may be pressurized or be at a partial vacuum. For example, the gas 220 may be supplied by the pneumatic assembly 152 to pressurize the first pneumatic 134a, or the gas 220 may at a partial vacuum such as when the pneumatic assembly is applying a vacuum to the first compartment 134a. The gas 220 and the tubing 206 have different refractive indexes. FIG. 2B shows an exemplary first light ray 240 of the light 210 traveling along a first trajectory 242 as the first light ray 240 travels through the tubing 206 filled with the gas 220. The first light ray 240 is refracted as it passes through the material of the tubing 206 and the gas 220.

FIG. 2C illustrates a fluid 230 disposed in the bore 208 in a static steady-state, and the fluid 230 has a different refractive index than the tubing 206 and the gas 220. The fluid 230 may be a polishing fluid, e.g., a slurry or other liquid. The fluid 230 lenses the first light ray 240 toward the photo diode 202 along a second trajectory 244 due to refraction as the first light ray 240 travels though the material of the tubing 206 and the fluid 230. As shown, the presence of the fluid 230 causes the second trajectory 244 of the first light ray 240 to shift toward the photo diode 202 upon exiting the tubing 206 as compared to the first trajectory 242. The first trajectory 242 is shown in a dashed line to illustrate the shift caused by the fluid 230.

The lensing effect of the fluid 230 causes some rays of the light 210 to be detected by the photo diode 202 that are not detected by the photo diode 202 when a gas 220 is disposed in the tubing 206. The increase in light 210 detected by the photo diode 202 indicates the presence of a fluid in the first flow path 156a.

Some light 210 is absorbed by the fluid 230. For example, the light 210 passing through the fluid 230 may be converted to heat energy. Some fluids 230 have a composition with a high degree of absorbance that reduces amount of light 210 that reaches the photo diode 202. For example, opaque fluids, such as certain polishing fluids having a relatively high concentration of abrasive particles, e.g., polishing fluids used to polish a silicon oxide material layer, may have a high absorbance. Absorption of the light 210 by the fluid 230 may cancel out the lensing effect. In some instances, the absorbance of the fluid 230 may cause the control system 136 to not recognize that a fluid 230 replaced the gas 220 in the first flow path 156a. The fluid 230 may have an absorbance that causes the amount of light 210 detected by the photo diode 202 to be substantially similar to the amount of light that would be detected by the photo diode 202 when a gas 220, such as a dried air, is disposed in the flow path 156a. For example, the amount of light 210 detected by the photo diode 202 may not exceed a threshold used to detect the presence of the fluid 230 due to the absorbance of the fluid 230.

Figure 2D:
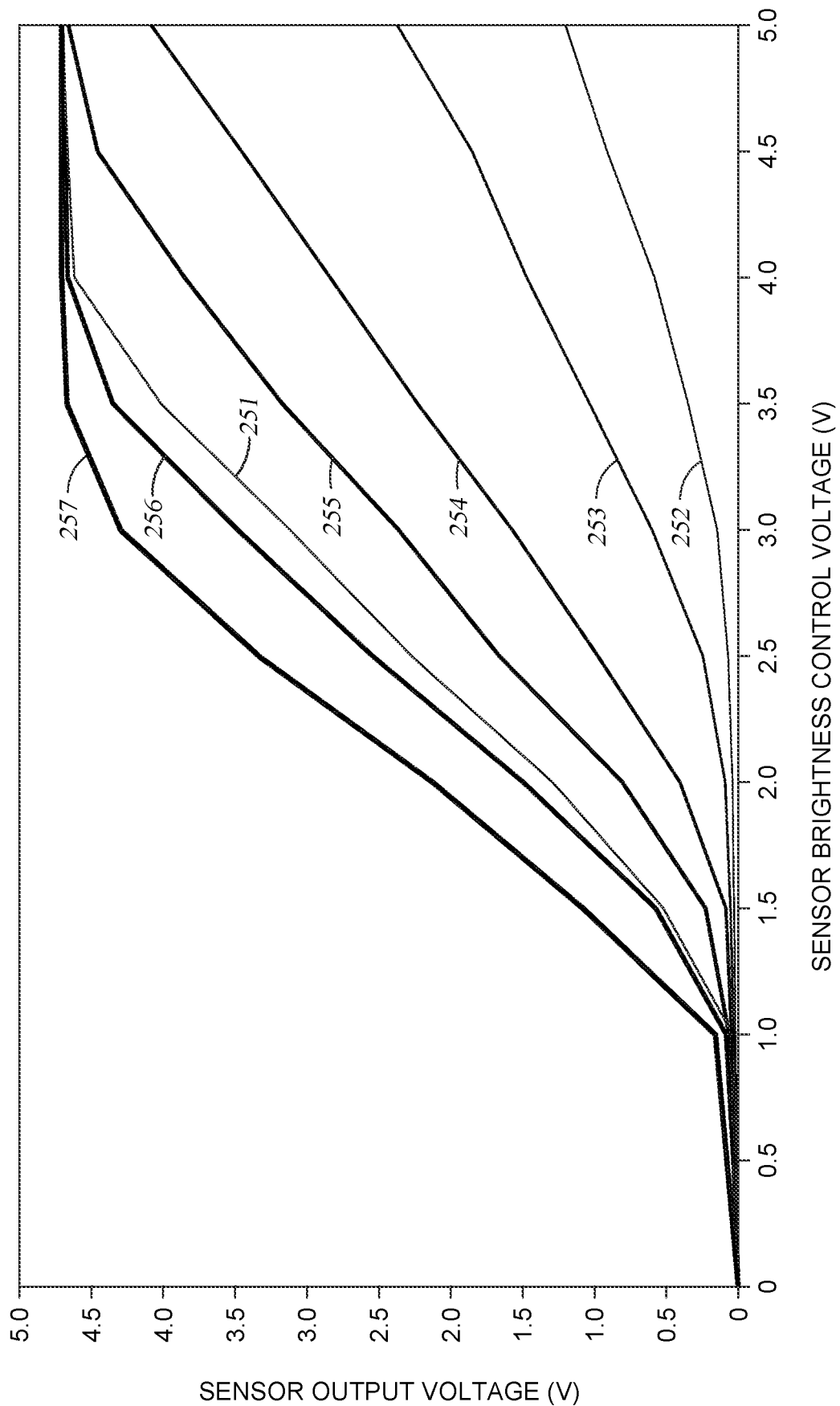

FIG. 2D illustrates the output of the photo diode 202 upon detecting light 210 from the light source 200 to illustrate the effects of lensing and absorption for various mixtures of oxide slurries with water. The X-axis illustrates the control voltage supplied to the sensor 160a to produce the light 210. The Y-axis illustrates the output voltage of the sensor 160a corresponding to the light 210 detected by the photo diode 202 originating from the light source 200, including light 210 that passed through the flow path 156a.

The first curve 251 illustrates the output voltage with dried air disposed in the bore 208. The first curve 251 is a base-line to illustrate the effect of lensing and absorption for various compositions of white oxide slurry as compared to a dried-air. The second curve 252 illustrates the output voltage with 100% white oxide slurry disposed in the bore 208. The third curve 253 illustrates the output voltage with 80% white oxide slurry disposed in the bore 208. The fourth curve 254 illustrates the output voltage with 60% white oxide slurry disposed in the bore 208. The fifth curve 255 illustrates the output voltage with 50% white oxide slurry disposed in the bore 208. The sixth curve 256 illustrates the output voltage with 40% white oxide slurry disposed in the bore 208. The seventh curve 257 illustrates the output voltage with 20% white oxide slurry disposed in the bore 208. The percentage of the white oxide slurry shows the percentage of the mixture that is white oxide slurry and the amount that is additional water. For example, the 80% white oxide slurry is a mixture that is 20% water and 80% white oxide slurry.

The sixth curve 256 and the seventh curve 257 illustrate that the lensing of the fluid mixture increases amount of light received by the photo diode 202 despite the absorbance of the mixture. The sixth curve 256 and seventh curve 257 show that the sensor 160a produced a higher voltage output at certain control voltages than the first curve 251. For example, the sensor 160a outputs a higher voltage for a 20% white oxide slurry than a dried air between about 1.5V to about 4V of control voltage supplied to the sensor 160aas shown by the seventh curve 257. However, the output voltage for the first curve 251, sixth curve 256, and the seventh curve 257 may be substantially similar at certain control voltages, such as a control voltage between 4V and 5V due to the saturation by the incoming light 210. Thus, the light 210 may have an intensity that overwhelms the lensing effect and causes the photo diode 202 to detect similar amounts of the light despite the difference of material disposed in the tube 206. Therefore, the control voltage has a dynamic working range for detecting the presence of a fluid, such as slurry fluid, from baseline of dried gas (such as air or nitrogen). For example, the dynamic working range may be a control voltage between 1.5 V to 4 V. For example, an optimum range for the best distinction between the baseline dried gas and fluid may be an output voltage between 2.5V to 3.0V.

As shown by the second curve 252, the 100% white oxide slurry has a high absorbance and reduces the amount of light detected by the photo diode 202 as compared to the amount of light detected if dried air was disposed in the tube 206. The absorbance of the slurry mixture decreases as the concentration of white oxide slurry decreases. The decrease in absorbance is reflected in FIG. 2D, which illustrates that the output voltage increases as the concentration of white oxide slurry decreases. For example, the output of the photo diode 202 is greater for the 80% white oxide slurry than the 100% white oxide slurry between 2V and 5V of the control voltage supplied to the light source 200. For example, the output of the photo diode 202 is greater for the 60% white oxide slurry than the 80% white oxide slurry between 2V and 5V of the control voltage supplied to the light source 200.

The photo diode 202 may output data (e.g., the output voltage) with a sufficient signal to noise ratio to detect some fluid compositions flowing through the tubing 206 at some voltages of the light source 200 by a direct comparison to the base-line first curve 251. For example, the control system 136 may be able to distinguish between dried air and 100% white oxide slurry at about 4V of control voltage supplied to the light source 200, such as by comparing the output to a threshold.

But, the output of the photo diode 202 may not have a signal to noise ratio sufficient to distinguish the fluid from a gas, such as the dried air, for all compositions of the fluid 230 at certain intensities of the light source 200. There may be some concentrations of white slurry that results in an output that is similar to the output for a gas, such as a dried air shown in the first curve 251. For example, some concentrations of the white slurry may produce a curve similar to the first curve 251 such that the control system 136 is unable to distinguish between the slurry and the dried air. And, as shown in FIG. 2D, there are some control voltages of the light source 200 that result in the photo diode 202 outputting data for a slurry mixture that is substantially similar to output for the presence of dried air. For example, the output voltage for the first curve 251, sixth curve 256, and the seventh curve 257 may be substantially similar at certain control voltages of the light source 200, such as a control voltage between 4V and 5V.

For example, the first curve 251 is sandwiched by fifth curve 255 and the sixth curve 256 corresponding to the white oxide slurry concentrations of 50% and 40%, respectively. It shall be expected that certain concentrations of the white slurry between 50% and 40% may produce a curve similar to the first curve 251 even with control voltage at optimum range, such that the control system 136 is unable to distinguish between the slurry and the dried air. Therefore, comparing the output voltage to the baseline curve 251 may not be suitable for detecting the presence of a fluid in all situations.

Additionally, the composition of the fluid 230 passing by the first sensor 160a may be unknown. For example, the fluid 230 may have a proprietary composition that is unknown to the control system 136. The proprietary composition may not be satisfactorily detectable by a direct comparison of the sensor output to a base-line, such as the base-line first curve 251 for dried air, or by a comparison of the sensor output to a threshold based on the base-line. Additionally, the unknown fluid 230 may have a composition that is indistinguishable from a gas, such as dried-air or nitrogen gas, by the sensor at certain intensities of the light source 200.

As fluid 230 ingresses into the tubing 206 due to the vacuum applied by the pneumatic assembly 152, there may be an initial turbulent burst of fluid that flows by the sensor

160. This initial turbulent burst may include one or more bubbles of the gas 220 disposed in the fluid 230. The bubbles define one or more fluid to air interfaces. In some embodiments, the fluid 230 passing by the first sensor 160*a* may be one or more droplets that do not completely fill the bore 208, and the droplets may define one or more fluid to air interfaces. FIGS. 2E-2H illustrate a total internal reflection (TIR) caused by a fluid to gas interface. As will be explained, total internal reflection impacts the output of the first sensor 160*a* and can be used to identify the presence of a fluid regardless of the composition of the fluid.

Figure 2E:
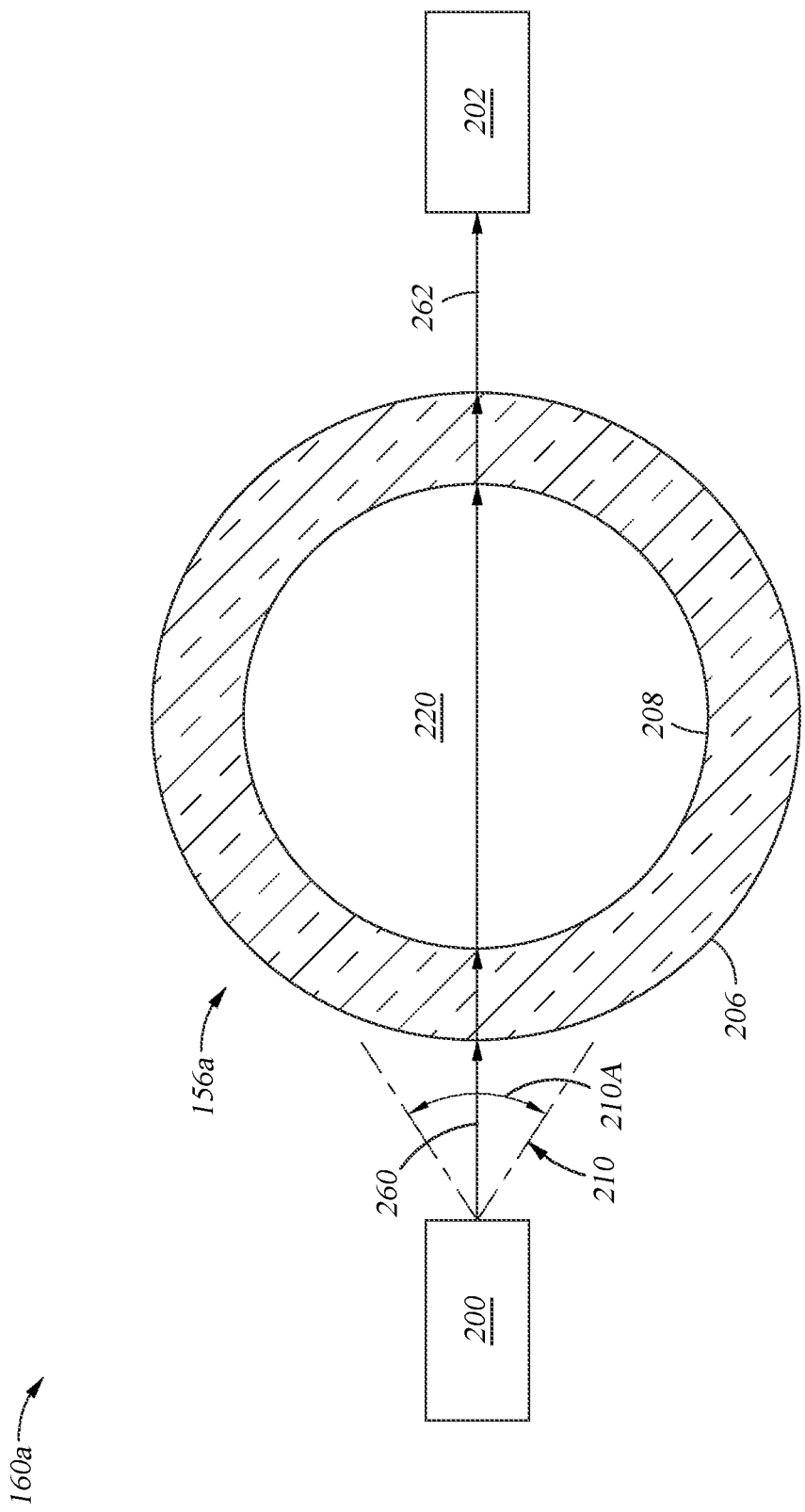
Figure 2F:
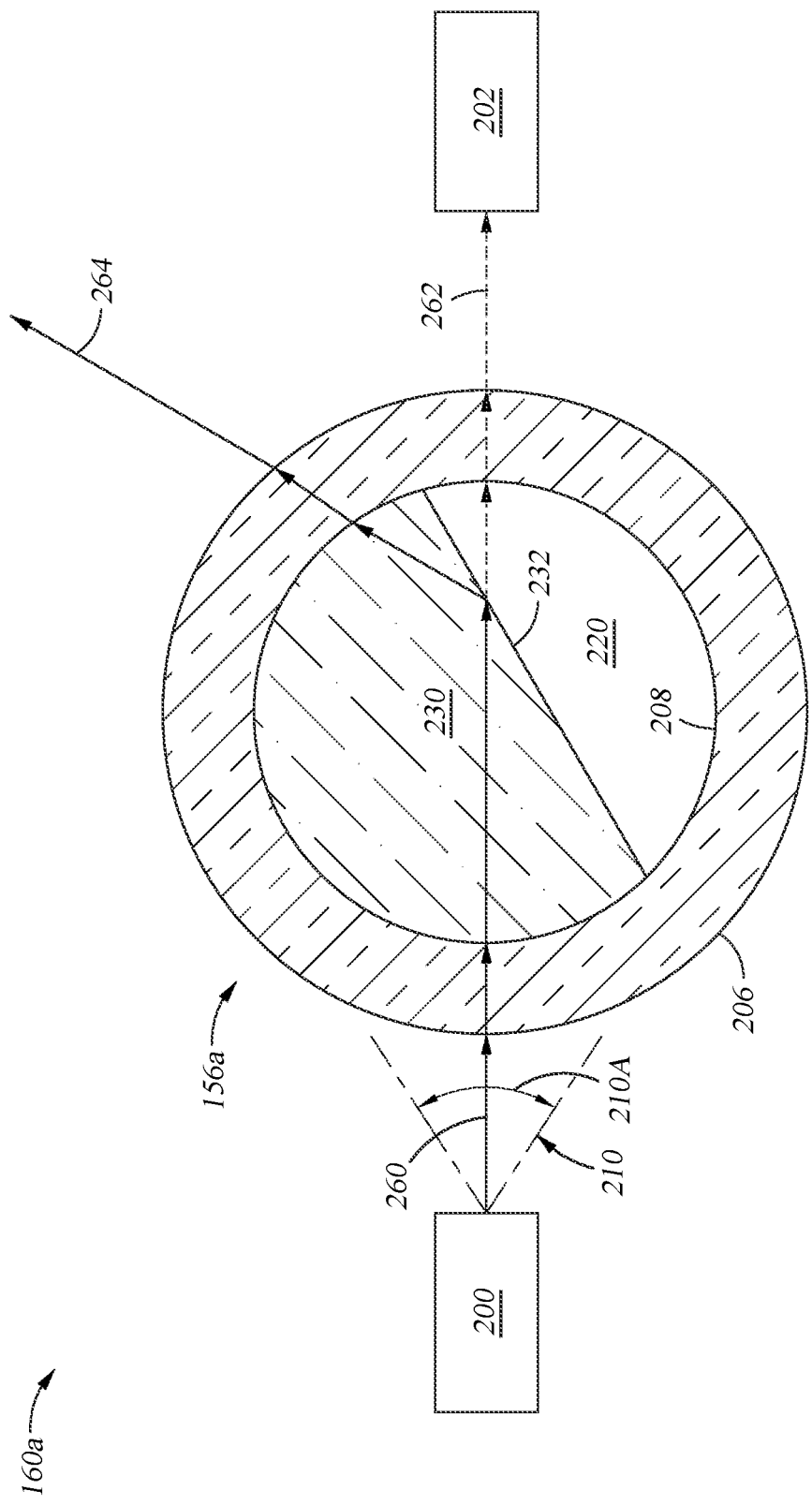

FIG. 2E is similar to FIG. 2B, in that a gas 220 is disposed in the bore 208. As shown in FIGS. 2E and 2F, a second light ray 260 of the light 210 is emitted from the light source 200 at a normal incidence angle. The second light ray 260 is shown following a first trajectory 262 as the second light ray 260 passes through the material of the tubing 206 and the gas 220. The first trajectory 262 directs the second light ray 260 towards the photo diode 202. FIG. 2F illustrates a fluid 230 partially filling the tube 206, such that there is a gas bubble 220 disposed in the bore 208. A first fluid to air interface 232 of the gas bubble 220 with the fluid 230 is shown at an angle relative to the second light ray 260. The first fluid to air interface 232 may be at an angle sufficient to cause a total internal reflection of the second light ray 260 which redirects the second light ray 260 back into the fluid 230. A second trajectory 264 illustrates the path of the second light ray 260 upon being totally reflected by the first fluid to gas interface 232. The total internal reflection of the second light ray 260 along the second trajectory 264 directs the second light ray 260 away from the photo diode 202 which prevents the second light ray 260 from being detected. The first trajectory 262 is shown as a dashed line in FIG. 2F to better show the change in trajectory of the second light ray 260 by the first fluid to air interface 232. The total internal reflection caused by a fluid to air interface may result in the light 210 not being detected by the photo diode 202 that would have otherwise been detected in the presence of the gas 220 alone. Thus, total internal reflection may decrease the amount of light 210 that is detected by the photo diode 202.

Figure 2G:
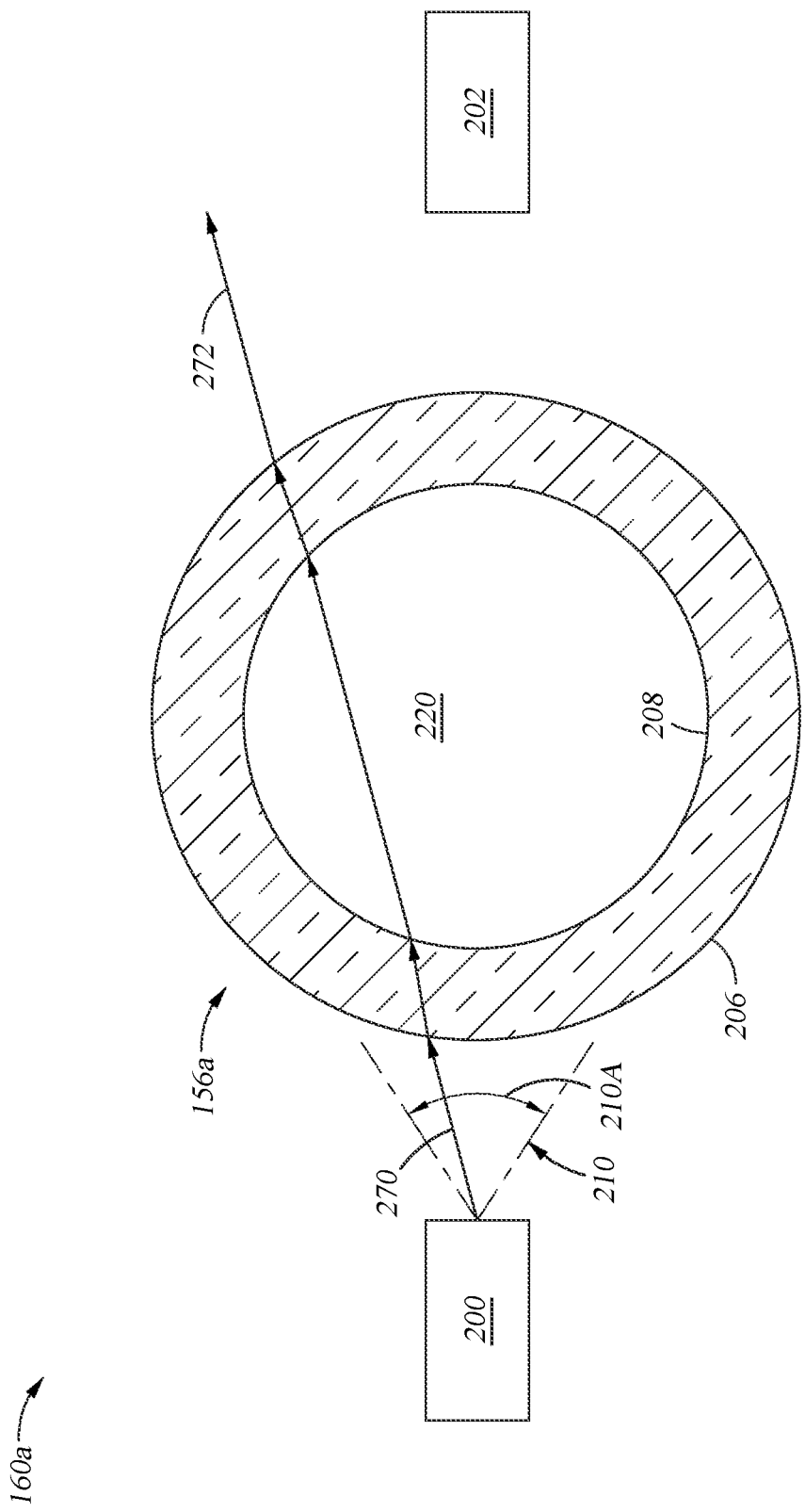
Figure 2H:
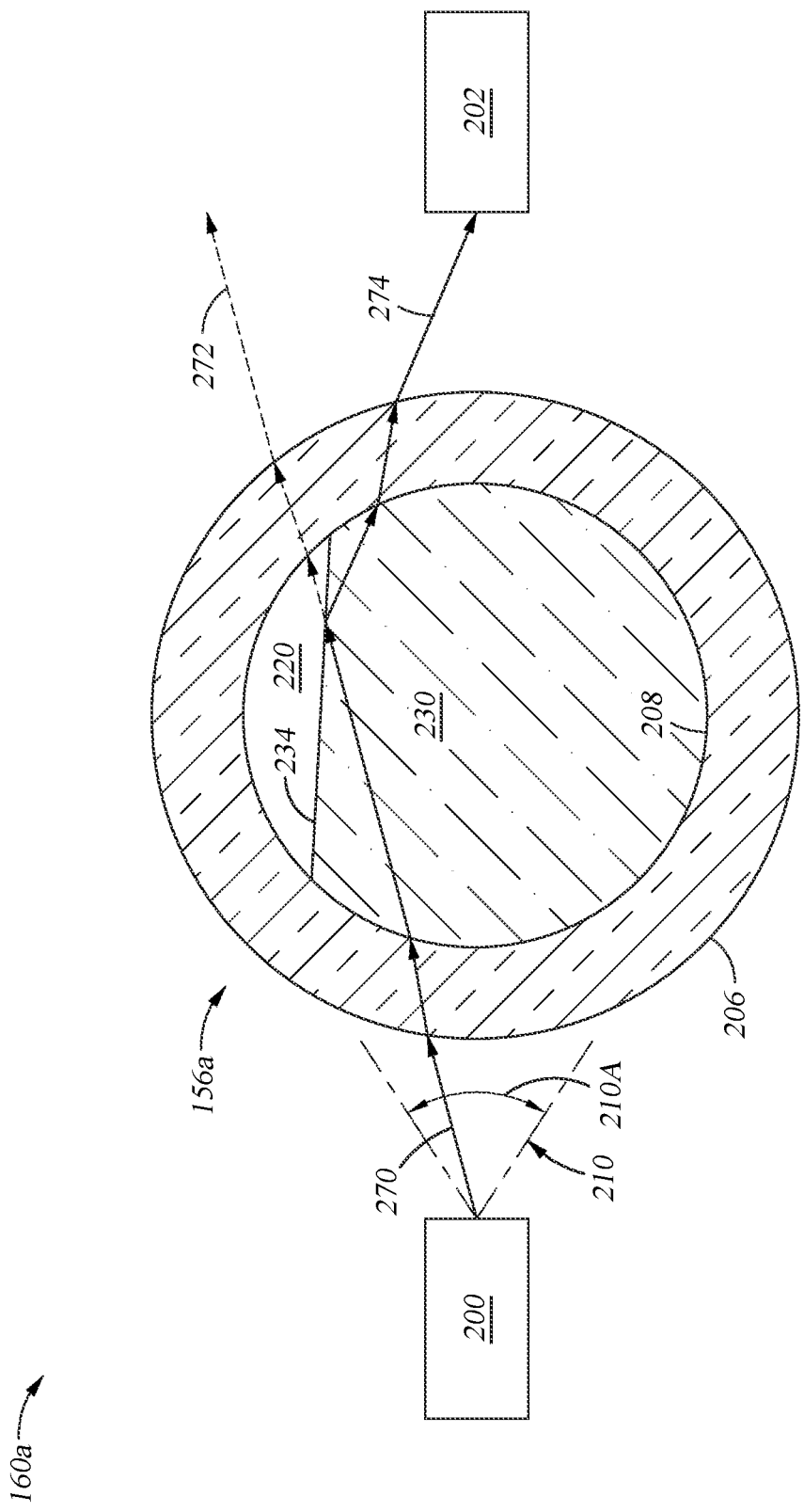

FIG. 2G is similar to FIG. 2B, in that a gas 220 is disposed in the bore 208. As shown in FIGS. 2G and 2H, a third light ray 270 of the light 210 is emitted from the light source 200. The third light ray 270 is shown following a first trajectory 272 as the third light ray 270 passes through the material of the tubing 206 and the gas 220. As shown by the first trajectory 272, the third light ray 270 is not directed toward the photo diode 202 and is thus not detected by the photo diode 202. FIG. 2H illustrates a fluid 230 partially filling the tube 206, such that there is a gas bubble 220 disposed in the bore 208, which results in a second fluid to air interface 234. The second fluid to air interface 234 may be at an angle sufficient to cause the total internal reflection of the third light ray 270. The second trajectory 274 illustrates the path of the third light ray 270 upon being totally reflected by the second fluid to gas interface 234. The TIR of the third light ray 270 along the second trajectory 274 directs the third light ray 270 toward the photo diode 202. The first trajectory 272 is shown as a dashed line in FIG. 2H to better show the change in trajectory of the third light ray 270 by the second fluid to air interface 234. Total internal reflection may result in light 210 being detected by the photo diode 202 that would have otherwise been undetected in the presence of the gas 220 alone. Thus, total internal reflection may increase the amount of light 210 that is detected by the photo diode 202.

A fluid to gas interface, such as interfaces 232, 234, may cause a pronounced spike in the output of the photo diode caused by an increase or decrease in the amount of light detected as a result of total internal reflection. The angle and number of fluid to gas interfaces flowing by the first sensor 160*a* may fluctuate as the fluid passes. This change is reflected in the first sensor 160*a* output as the amount of light 210 detected fluctuates.

Figure 3A:
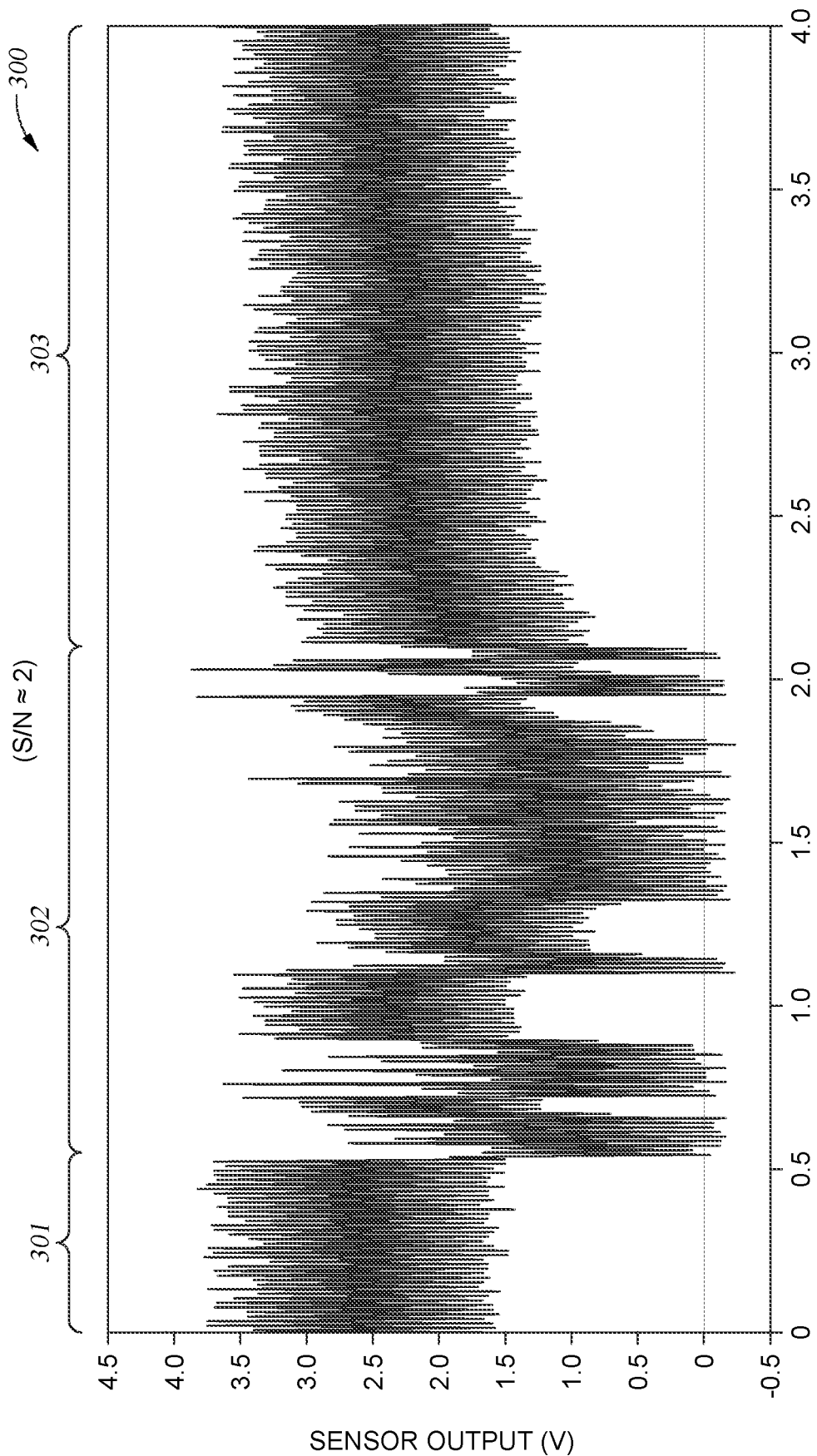
FIG. 3A illustrates the output of the sensor.

FIG. 3A illustrates the output 300 (e.g., output voltage) of a photo diode 202 of the first sensor 160*a* in response to a light 210 emitted from the light source 200, which is representative of output of a photodiode of the second sensor 160*b* and third sensor 160*c*. The sensor output 300 may be further processed by an analog electronic circuit such as an amplifier and the circuit output may be measured and displayed by an oscilloscope. As shown in FIG. 3A, the output 300, shown in volts on the Y-axis, of the photo diode 202 fluctuates over time, shown as seconds in the X-axis. In the first region 301 of the output 300, gas of the pressure system 150 is flowing past the sensor 160. In region 302 of the output 300, a turbulent fluid that is 60% white oxide slurry mixed with air bubbles is initially flowing past the sensor 160. In the third region 303 of the output 300, a steady-state flow of the 60% white oxide slurry is flowing smoothly past the first sensor 160*a* with few or no bubbles.

The second region 302 of the output 300 includes spikes with a greater magnitude than in the other regions 301, 303 of the output 300. The second region 302 includes the effects of lensing, absorption, and total internal refraction. The second region 302 is the signal that a fluid is present, and the first region 301 and/or the second region 303 are the background noise. As shown in FIG. 3A, the signal to noise ratio of the second region 302 as compared to the other two regions 301, 303 is about 2. The signal to noise ratio may be measured as the difference between the maximum and minimum detected output in the second region 302 divided by the maximum and minimum detected output in region 301 of the output 300.

Figure 3B:
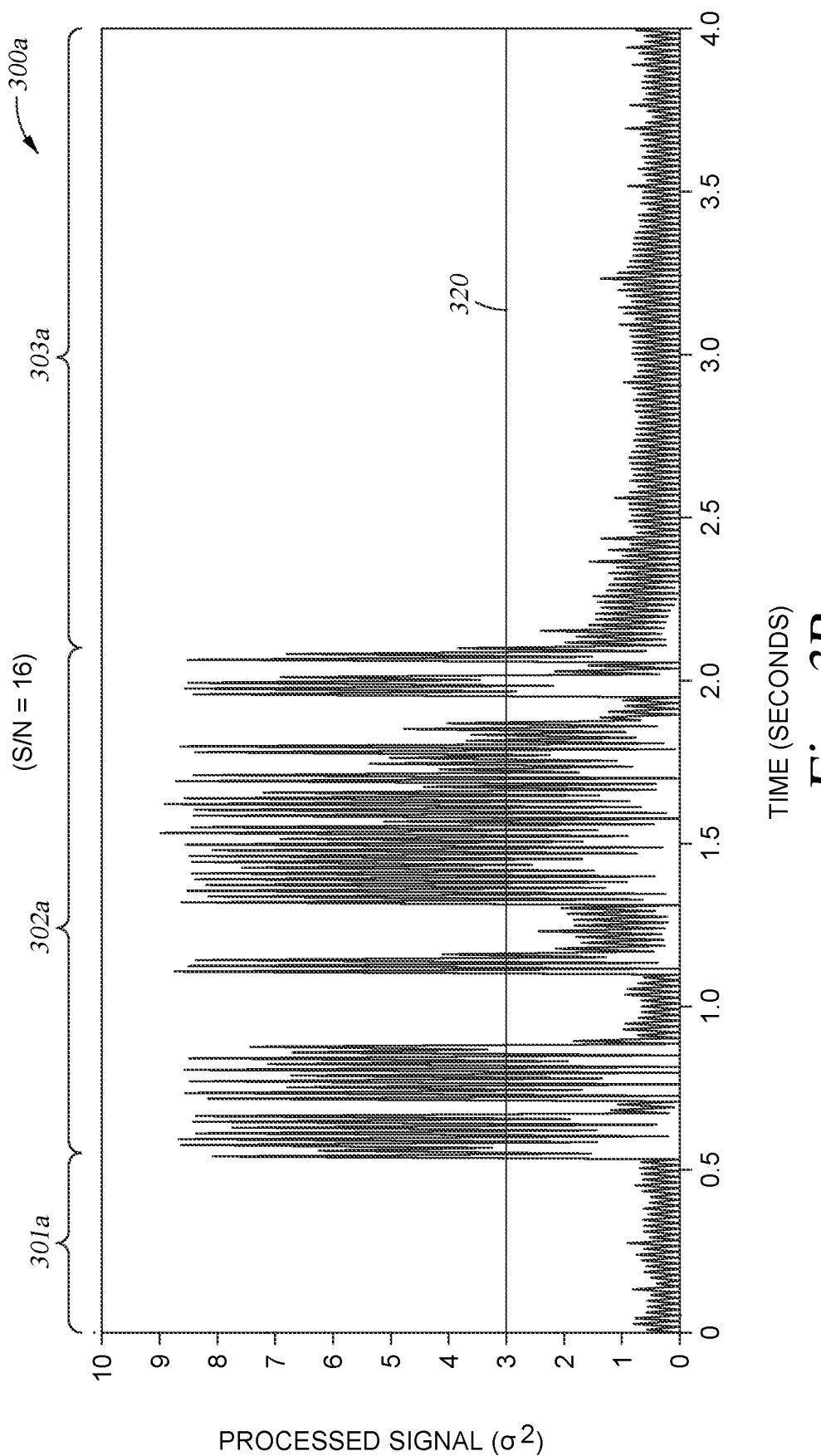
FIG. 3B illustrates a processed output of the sensor.

To enhance the signal to noise ratio, the output 300 may be processed by the control system 136. For example a CPU 140 may process the output 300 to produce a processed output 300*a* shown in FIG. 3B. In some embodiments, the output 300 of the first sensor 160*a*, that is processed may be raw data, such as raw data from an electric circuit. In some embodiments, the output 300 of the raw circuit data is exported to a data analysis program, such as Microsoft Excel, prior to being processed. The processed output 300*a* includes a first processed region 301*a* that corresponds to the first region 301, a second processed region 302*a* corresponding to the second region 302, and a third processed region 303*a* corresponding to the third region 303. As shown, the distinction between the second processed region 302*a* and the first and third processed regions 301*a*, 302*a* is more pronounced as compared to the original (e.g., unprocessed) output 300. As shown in FIG. 3B, the signal to noise ratio is about 16.

Figures 3C, 4:
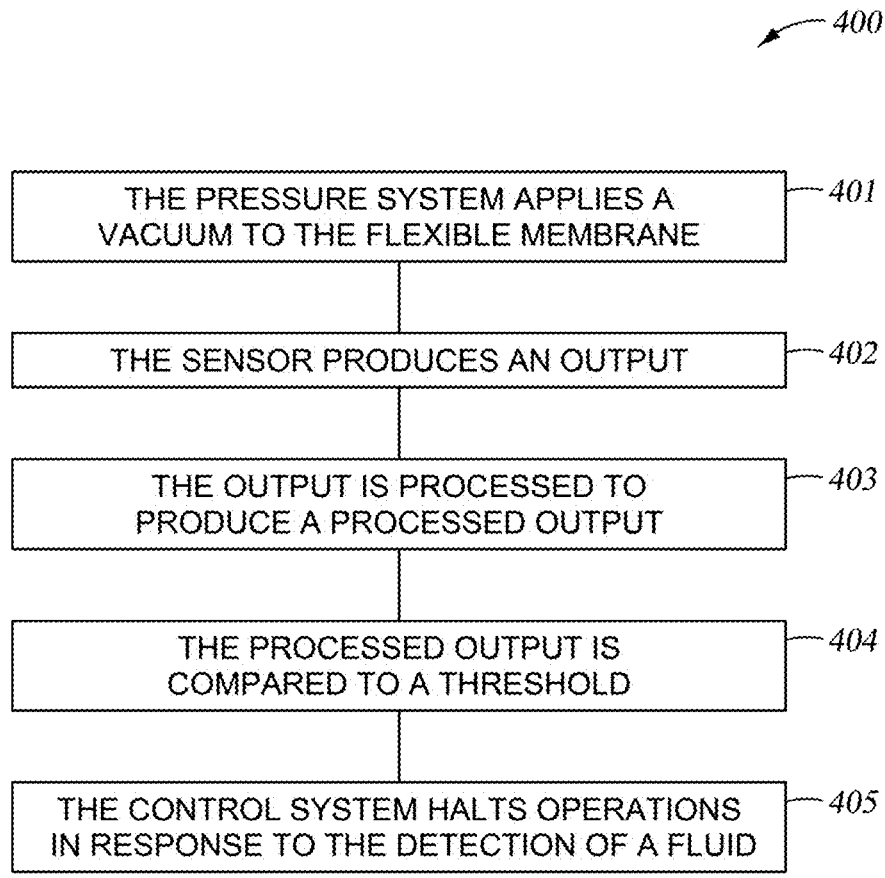
FIG. 3C illustrates an exemplary algorithm used to process the sensor output.
FIG. 4 is a diagram illustrating a method of detecting a failed membrane with a sensor.

The output 300 may be processed by an algorithm 310 shown in FIG. 3C to produce the processed output 300*a*. The processed output 300*a* shown in FIG. 3B is the standard deviation squared (shown as a $\sigma^2$), also known as the variance. Processed output 300*a* may be plotted as the variance (Y-axis) over time (X-axis) as shown in FIG. 3B. The variable $V_k$ is the output voltage of the photo diode 202 and the index of summation k, where k=i, i+1, . . . , i+N. The index i indicate the i-th point in time. The variable a is the mean. The N is the number of samples chosen around each point in time i, and N is a smoothing factor. For example, the N may be a value between 3 and 10, including 3 and 10.

The processed output 300a shown in FIG. 3B was produced by processing the output 300 with the algorithm 310. The value of N was set to 4, and the mean of the output 300a is 2.5 V.

The control system 136, such as a CPU 140, may monitor the processed output 300a to determine if a threshold 320 is exceeded. The threshold 320 may be a value of the variance, such as a value of 3 as shown in FIG. 3B. The threshold 320 may be selected based on the fluid 230 (e.g., polishing slurry). For example, the threshold 320 may be selected based on oxide slurry concentration of 50%, which is 50% oxide slurry mixed with 50% deionized water. A threshold 320 based on the variance of the output 300 decreases the instances of a false positive or a false negative detection of a fluid with the first sensor 160a since the signal to noise ratio is enhanced as compared to the original output 300. The threshold 320 may be set based on the maximum expected value associated with the sensor detecting a turbulent fluid 230 as processed with the algorithm 310. The threshold 320 may be set with an additional margin or factor of safety, such as a value that is about 50 to 100% more than the maximum value detected in the first region 301a or third region 303a. In some embodiments, the threshold 320 may be selected based on the gas used by the pneumatic assembly 152. For example, the threshold 320 may be selected based on the expected variance value for dried air or nitrogen gas, such as the expected variance of the gas over a similar time duration.

In some embodiments, the signal to noise ratio of the photo diode 202 output (e.g., output 300) may be increased from about 2 to about 9 by processing the output with the algorithm 310. In some embodiments, the signal to noise ratio is increased from about 2 to about 10 by processing the output with the algorithm 310. In some embodiments the signal to noise ration may be increased from about 2 to about 24 by processing the output with the algorithm 310.

Comparing the processed output against the threshold facilitates the detection of an initial burst of fluid regardless of the composition of the fluid. Additionally, comparing the processed output 300a against the threshold 320 allows for the initial burst of a fluid to be detected even if the composition of the fluid(s) used in the multi-station polishing system 101 are unknown to the control system 136 and/or sensor 160.

In some instances, the fluid passing by the sensor, such as first sensor 160a, may initially include or define one or more fluid to air interfaces before transitioning into a steady-state flow without one or more fluid to air interfaces, such as a laminar flow. The control system 136 is able to detect the initial burst of the fluid by comparing the processed output against the threshold regardless how fast or how slow if the fluid transitions into a steady-state flow without one or more fluid to air interfaces.

For some composition of the fluid(s) used in the multi-station polishing system 101, the sensor, such as first sensor 160a, is able to detect the presence of a steady-state flow of the fluid 230 without one or more fluid to air interfaces and differentiates the fluid 230 from the base-line (e.g., first curve 251), such as where the fluid 230 filled in the bore 208 of the tube 206 as illustrated in FIG. 2C.

The control system 136 could monitor for a failure of the membrane 132 without processing the sensor output through the algorithm, such as algorithm 310, comparing the sensor output to a threshold. But, the signal to noise ratio of the output is less than the signal to noise ratio of an output processed by an algorithm, such as algorithm 310. Comparing the unprocessed sensor output to a threshold, such as a sensor output value, is more susceptible to false positives and false negatives because of the lower signal to noise ratio. For example, the unprocessed output of a gas and a liquid may be similar based on the composition of the liquid, and the threshold may be set at a value that fails to register the presence of the liquid.

The control system 136 may monitor for the failure of a membrane 132 over a time period, such as a test time period. A vacuum may be applied to the membrane 132 by the pressure system 150 over the test time period. If a fluid is detected in the pressure system 150 during the test time period, then the control system 136 may generate an alert that the membrane 132 has failed to the user and/or the pressure system 150 may halt the operation of the polishing station 100. If no fluid is detected during the test time period, then the control system 136 may proceed with an operation, such as a polishing operation or an operation to move the substrate 122.

FIG. 4 illustrates an exemplary method 400 of detecting a failed membrane 132 with a sensor, such as first sensor 160a. As shown at 401, the pressure system 150 applies a vacuum to the membrane 132. The vacuum may be applied over a time period, such as a test time period. The test time period may be a few seconds, such as ten seconds, or a few minutes, such as two minutes. If the membrane 132 has a failure, such as a tear, fluid is able to ingress into the pressure system 150. The sensor, such as the first sensor 160a, monitors for fluid while the vacuum is being applied. The sensor produces an output, such as data, at block 402. The sensor output may be transmitted to the control system 136, such as the CPU 140. At block 403, the output of the sensor is processed to produce a processed output. The sensor output is processed to enhance the signal to noise ratio of the output, such as by processing the sensor output with the algorithm 310. The sensor output may be processed by the control system 136, such as by CPU 140. At block 404, the processed output is compared to a threshold. The control system 136, such as the CPU 140, may compare the processed output to the threshold to determine if the threshold is exceeded. A fluid is detected by the sensor if the processed output exceeds the threshold. If a fluid is detected by the sensor 160, then the membrane 132 has failed. In some embodiments, the control system 136 may halt operations of the control station 100 or the multi-station polishing system 101 as shown at block 405. In some embodiments, the control system 136 may generate an alert about the failure of the membrane, and the user may initiate a shutdown of the control station 100 or the multi-station polishing system 101.

Figure 5:
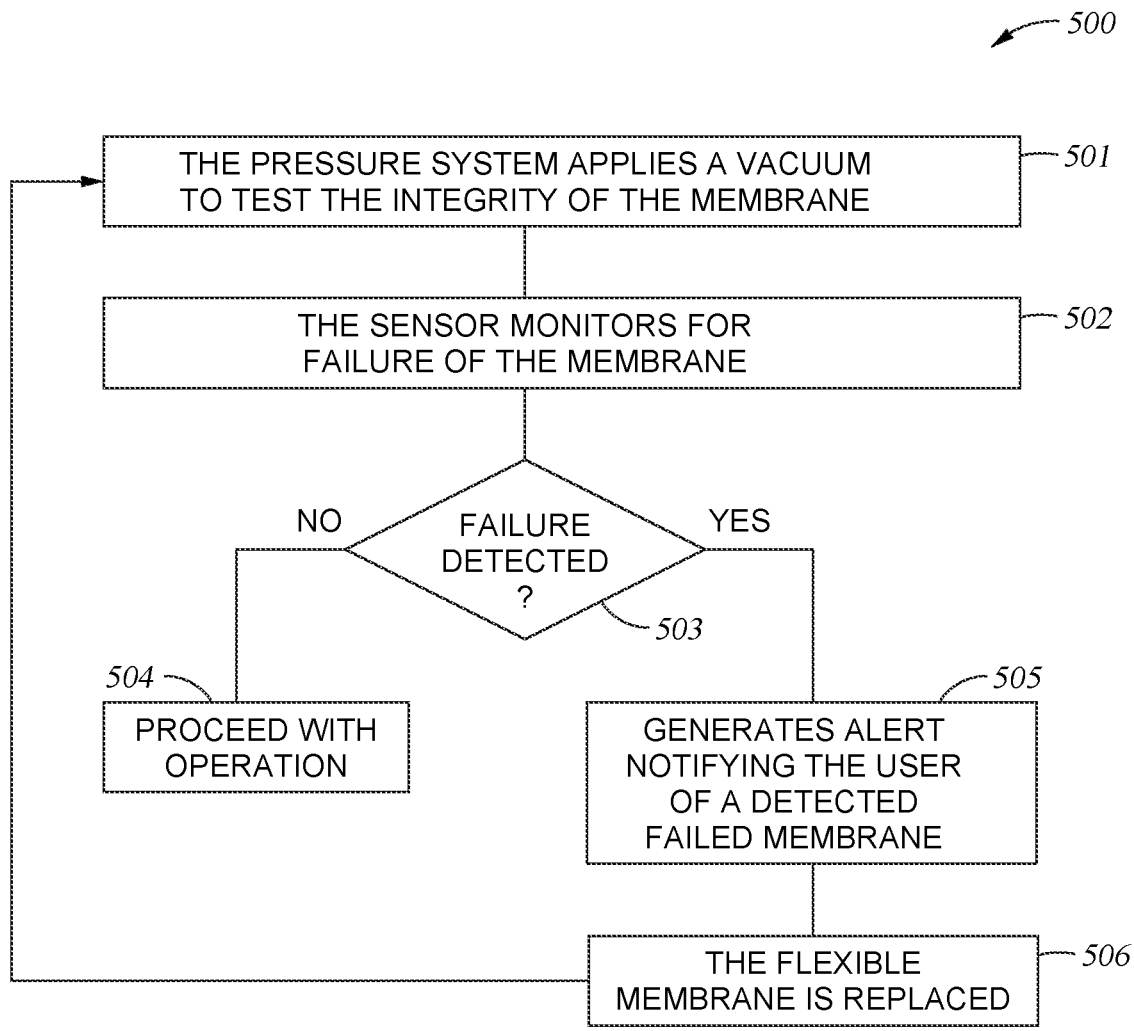
FIG. 5 is a diagram illustrating a method of testing the integrity of the membrane.

FIG. 5 illustrates an exemplary method 500 of testing the integrity of the membrane 132. The integrity of the membrane 132 may be tested prior to moving a substrate 122, polishing a substrate 122, or vacuum chucking a substrate 122 to the membrane 132. As shown at 501, an instruction is sent to the pressure system 150 to apply a vacuum to the membrane 132. For example, the pressure system 150 may be instructed to apply the vacuum to the membrane 132 before an operation to move the substrate 122 from the loading station 103 or to move the substrate from a polishing pad 106. The vacuum may be applied over a test time period. The substrate 122 may be vacuum-chucked to the membrane 132 during the test.

As shown in block 502, the control system 136 monitors for failure of the membrane 132 by processing the output of the sensor, such as first sensor 160a, to produce a processed output. At block 503, the control system 136 determines if the membrane 132 has failed by comparing the processed output to a threshold. A failure is detected if the threshold is exceeded.

If a failure is not detected, then the control system 136 proceeds with normal operation of the control station 100 and/or the multi-station polishing system 101 as shown at block 504, such as proceeding with moving the substrate 122 from the loading station 103 to a polishing pad 106. In some embodiments, the control system 136 instructs the pressure system 150 to apply a vacuum to the membrane 132 to vacuum chuck the substrate 122 to the membrane if a failure of the membrane 132 is not detected. In some embodiments, the pressure system 150 applies a pressure to the membrane to push the substrate 122 against the polishing pad 106 if a failure of the membrane 132 is not detected. In some embodiments, the control system 136 instructs the substrate handling carriage 115 to move the substrate 122 from a loading station 103 to a polishing pad 106, or to move the substrate 122 from a polishing pad 106, if a failure is not detected.

If a failure is detected, the control system 136 generates an alert notifying the user of the failed membrane as shown at block 505. The control system 136 may halt operations of the control station 100 or the multi-station polishing system 101 if a failed membrane 132 is detected. If a failure is detected, then the membrane 132 is replaced as shown at block 506. The pressure system 150 may also be cleaned prior to or during the replacement of the membrane 132. The method 500 may repeat after the membrane 132 is replaced until a failure is not detected.

In some embodiments, the user interface of the multi-station polishing system 101 displays the sensor output and/or the processed sensor output. A user may selectively change the threshold, such as changing the threshold upon changing a slurry fluid used in a polishing stations 100 or changing the gas used by the pressure system 150.

Each sensor 160a-c may be housed or otherwise shielded to reduce the exposure of the sensor to ambient light, such as shielding the light source 200 and photo diode 202 from ambient light. In some embodiments, the sensor housing includes a material that absorbs light not detected by the sensor to prevent the light from reflecting within the housing and into the photo diode 202. Reducing ambient light and reducing reflection of light into the sensor reduces noise in the sensor output.

In some embodiments, the sensors, such as the first sensor 160a, the second sensor 160b, and the third sensor 160c, may be included in a sensor assembly. The sensor assembly may have a housing with ports to connect to the flow paths 156a-c. The sensors may be attached to the rotary union 154 by the attachment of the sensor assembly to the rotary union 154.

In some embodiments, a fluid is detected by comparing the output of a sensor to a base-line value, such as the expected output for dried air for a given intensity of light. The control system 136 may detect a fluid if the difference between the sensor output and the base-line exceeds a threshold, such as a sensor output that is more than 1V above or below the base-line.

In some embodiments of the polishing station 100, the membrane 132 has one compartment. One sensor monitors for polishing fluid ingress into the one compartment. In some embodiments of the polishing station 100, the membrane 132 includes two or more compartments. Each compartment monitored by a respective sensor to detect a failure of the membrane 132.

In one embodiment, a polishing system includes a pressure system, a substrate carrier including a membrane, a sensor, and a control system. The membrane is fluidly coupled to the pressure system, and the pressure system is configured to control the flow and pressure of a gas to the membranes. The sensor is configured to monitor the pressure system and produce an output based on conditions detected in the pressure system. The control system is coupled to the pressure system and sensor, and is configured to process the output to produce a processed output. The control system is configured to compare the processed output to a threshold to detect a presence of a fluid in the pressure system.

In some embodiments of the polishing system, the processed output is a variance of the output over time. In some embodiments, the threshold is a variance threshold based on the fluid. In some embodiments, the fluid is a polishing slurry. In some embodiments, the threshold is a variance threshold based on a gas in the pressure system.

In some embodiments of the polishing system, the sensor includes a light source configured to emit a light and a photo diode configured to detect the light.

In some embodiments of the polishing system, the sensor is attached to a rotary union coupled to the substrate carrier.

In some embodiments of the polishing system, the membrane defines a plurality of compartments in communication with the pressure system. The sensor comprises a plurality of sensors, each sensor of the plurality of sensors monitors a separate flow path of the pressure system, each flow path in fluid communication with a respective compartment of the plurality of compartments. The control system is configured to process the output of each sensor to produce the processed output of each sensor and compares the processed output of each sensor against the threshold to detect the presence of the fluid.

In some embodiments of the polishing system, the control system includes a computer readable medium having instructions stored therein for a membrane integrity method. The stored membrane integrity method includes (a) instructing the pressure system to apply a vacuum to the membrane; (b) processing the output while the vacuum is applied by the pressure system to produce the processed output; (c) comparing the processed output to the threshold; and (d) determining that the membrane has failed if the processed output exceeds the threshold. In some embodiments of the polishing system, the method further comprises generating an alert for a user identifying the failure of the membrane when the control system determines that the membrane has failed.

In some embodiments of the polishing system, the threshold is exceeded when the fluid passing the sensor includes at least one fluid to gas interface.

While the foregoing is directed to embodiments of the present disclosure, other and further embodiments of the disclosure may be devised without departing from the basic scope thereof, and the scope thereof is determined by the claims that follow.

What is claimed is:

1. A polishing system, comprising:
   a pressure system;
   a substrate carrier including a membrane, wherein a first compartment of the membrane is fluidly coupled to the pressure system;
   a first sensor configured to monitor the pressure system over a dynamic range for a plurality of control voltages and produce a first voltage output based on conditions detected in the pressure system over the dynamic range for the plurality of control voltages; and a control system coupled to the first sensor and configured to process the first voltage output to produce a first processed output over the dynamic range for the plurality of control voltages, the control system configured to compare the first processed output to a threshold to detect a presence of a liquid in the pressure system, wherein the control system is configured to perform operations comprising:

operating the substrate carrier to engage the membrane with a substrate, wherein an internal pressure of the membrane is selectively changed by the pressure system;

monitoring for a failure of the membrane during the operation with the first sensor providing light over the dynamic range, wherein the monitoring includes processing the first voltage output of the first sensor to produce the processed output;

comparing the processed output over the dynamic range to the threshold based on a gas in the pressure system, wherein the dynamic range negates a lensing effect of the liquid in the gas for detection of the liquid; and alerting a user of a failure of the membrane in response to the detection of the liquid in the pressure system.

2. The polishing system of claim 1, wherein the first processed output is a variance of the first voltage output over time, wherein the threshold is a variance threshold based on the gas in the pressure system.

3. The polishing system of claim 1, wherein the first sensor is attached to a rotary union coupled to the substrate carrier.

4. The polishing system of claim 1, wherein:
the pressure system includes a first tube fluidly coupled to the first compartment;
the first sensor includes a first light source shining a first light over a first dynamic range at the first tube and a first photo diode on the other side of the first tube from the first light source to detect the first light over the first dynamic range; and
the first sensor produces the first voltage output based on an amount of first light over the first dynamic range detected by the first photo diode.

5. The polishing system of claim 4, wherein:
the membrane includes a second compartment;
the pressure system includes a second tube fluidly coupled to the second tube;
the system includes a second sensor configured to monitor the second tube;
the second sensor includes a second light source shining a second light over a second dynamic range at the second tube and a second photo diode on the other side of the second tube from the second light source to detect the second light over the second dynamic range;
the second sensor produces a second voltage output based on the amount of second light detected by the second photo diode over the second dynamic range; and
the control system is coupled to the second sensor and configured to process the second voltage output to produce a second processed output,
the control system configured to compare the second processed output to the threshold to detect a presence of the liquid in the second tube.

6. The polishing system of claim 1, the control system including a computer readable medium having instructions stored thereon for a membrane integrity test, the instructions comprising:
(a) instructing the pressure system to apply a vacuum to the first compartment of the membrane;
(b) processing the voltage output while the vacuum is applied by the pressure system to produce the first processed output;
(c) comparing the first processed output to the threshold; and
(d) determining that the membrane has failed if the first processed output exceeds the threshold.

7. The polishing system of claim 6, wherein the instructions further comprises generating an alert for a user identifying the failure of the membrane when the control system determines that the membrane has failed.

8. The polishing system of claim 1, wherein the threshold is exceeded when fluid passing the first sensor includes at least one liquid to gas interface.

9. A non-transitory computer-readable medium comprising instructions that when executed by one or more processors cause a polishing system to conduct an integrity test of a membrane positioned in a carrier head, the integrity test, comprising:
applying a vacuum to a membrane with a pressure system over a period of time;
processing a voltage output of a sensor light over a dynamic range for a plurality of control voltages, the sensor light monitoring gas in the pressure system over the period of time to produce a processed output;
comparing the processed output over the dynamic range to a threshold to monitor for a presence of a liquid in the pressure system, wherein the dynamic range negates a lensing effect of the liquid in the gas for detection of the liquid; and
alerting a user of a failure of the membrane in response to the detection of the liquid in the pressure system.

10. The medium of claim 9, wherein the threshold is a variance threshold based on a gas of the pressure system.

11. The medium of claim 9, the integrity test further comprising:
detecting a failure of the membrane when the processed output exceeds the threshold.

12. The medium of claim 11, the integrity test further comprising generating an alert identifying the failure of the membrane when the failure is detected.

13. The medium of claim 11, wherein the threshold is exceeded when a fluid passing the sensor includes at least one liquid to gas interface.

14. The medium of claim 9, the integrity test further comprising:
after determining that no liquid is present in the pressure system over the time period, the one or more processors cause the polishing system to perform an operation including:
applying a vacuum to the membrane to vacuum chuck a substrate to the membrane; and
moving a substrate handling carriage to move the substrate from a loading station to a polishing pad, wherein the carrier head is coupled to the substrate handling carriage.

15. The medium of claim 9, the integrity test further comprising:
after determining that no liquid is present in the pressure system over the time period, the one or more processors cause the polishing system to perform an operation including applying a pressure to the membrane to push a surface of a substrate against a polishing pad.

16. A method of operating a polishing system, comprising:

operating a carrier head including a membrane engageable with a substrate, wherein an internal pressure of the membrane is selectively changed by a pressure system;

monitoring for a failure of the membrane during the operation with a sensor providing light over a dynamic range for a plurality of control voltages, wherein the monitoring includes processing a voltage output of the sensor to produce a processed output;

comparing the processed output over the dynamic range to a threshold based on a gas in the pressure system, wherein the dynamic range negates a lensing effect of a liquid in the gas for detection of the liquid; and alerting a user of a failure of the membrane in response to the detection the liquid in the pressure system.

17. The method of claim 16, wherein the operation is a test of the integrity of a membrane prior to polishing the substrate.

18. The method of claim 17, further comprising:
determining that no fluid is present in the pressure system.

19. The method of claim 18, further comprising:
after determining that no fluid is present in the pressure system, applying a vacuum to the membrane to vacuum chuck the substrate to the membrane; and instructing a substrate handling carriage to move the substrate from a loading station to a polishing pad, wherein the carrier head is coupled to the substrate handling carriage.

20. The method of claim 18, wherein the threshold is exceeded when a fluid passing the sensor includes at least one liquid to gas interface.

* * * * *